US012710290B2

(12) United States Patent
Khazaai et al.

(10) Patent No.: US 12,710,290 B2
(45) Date of Patent: Aug. 18, 2026

(54) INDUCTIVE LONG-RANGE POSITION SENSORS (LR-POS) INTEGRATED ON FLEXIBLE AND RIGID SUBSTRATES

(71) Applicant: BOURNS, INC., Riverside, CA (US)

(72) Inventors: Jay Jamshid Khazaai, Commerce, MI (US); Antonio Galvan, Riverside, CA (US); BJ Wang, Irvine, CA (US); Minh Nguyen, Riverside, CA (US); George Meikle, Riverside, CA (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 18/437,144

(22) Filed: Feb. 8, 2024

(65) Prior Publication Data

US 2025/0258019 A1 Aug. 14, 2025

(51) Int. Cl.

*G01D 5/20* (2006.01)
*G01B 7/00* (2006.01)
*G01B 7/30* (2006.01)

(52) U.S. Cl.

CPC ............ *G01D 5/202* (2013.01); *G01B 7/003* (2013.01); *G01B 7/30* (2013.01); *G01D 2205/18* (2021.05); *G01D 2205/70* (2021.05)

(58) Field of Classification Search

CPC .. G01D 5/202; G01D 5/2053; G01D 2205/18; G01D 2205/70; G01B 7/003; G01B 7/30; G01B 7/14

USPC ..................................................... 324/207.15

See application file for complete search history.

(56) References Cited

U.S. PATENT DOCUMENTS

| | | | | |
|---|---|---|---|---|
| 6,201,387 | B1 * | 3/2001 | Govari | G01B 7/30 324/207.17 |
| 2006/0144166 | A1 | 7/2006 | Ruehl et al. | |
| 2007/0051188 | A1 | 3/2007 | Kwun et al. | |
| 2008/0079422 | A1 | 4/2008 | Tiemann | |

(Continued)

FOREIGN PATENT DOCUMENTS

| | | |
|---|---|---|
| CN | 208125046 U | 11/2018 |
| CN | 210486909 U | 5/2020 |

OTHER PUBLICATIONS

Rahbar, Alireza. "Flexible Touchpads Based on Inductive Sensors Using Conductive Composite Polymer and Flexible Metal PCB." (2015). (Year: 2015).*

(Continued)

*Primary Examiner* — Christopher P McAndrew
(74) *Attorney, Agent, or Firm* — Knobbe, Martens, Olson & Bear, LLP

(57) ABSTRACT

An inductive position sensor is disclosed. The inductive position sensor can include a substrate having inductive sensing coils. The inductive sensing coils can be disposed on or at least partially embedded in the substrate. One or more processors can be configured to process an output signal and determine a distance based at least in part on the processed output signal electrically connected to the one or more inductive sensing coils. The processors can control and manage an input signal and an output signal. The one or more processors can be configured to determine a position of a target. The target can comprise an electrically conductive moving target configured for tracking an object for measuring a position of the target. The substrate can be a flexible substrate that is non-planar and conforms to a surface profile of the target.

20 Claims, 31 Drawing Sheets

(56) References Cited

U.S. PATENT DOCUMENTS

| | | | | |
|---|---|---|---|---|
| 2010/0201351 | A1* | 8/2010 | Clymer ................ | G01R 33/072 324/207.2 |
| 2017/0097437 | A1 | 4/2017 | Widmer et al. | |
| 2019/0223756 | A1* | 7/2019 | Buesseler ............... | H01F 27/29 |
| 2021/0311138 | A1 | 10/2021 | Khazaal et al. | |
| 2021/0381852 | A1 | 12/2021 | Steinich | |
| 2022/0265194 | A1 | 8/2022 | Govari et al. | |
| 2022/0357223 | A1 | 11/2022 | Khazaai et al. | |

OTHER PUBLICATIONS

Boyes, Geoffrey, "Synchro and Resolver Conversion," Chapter 1, Synchros and Resolvers, Chapter1.pdf, Analog Devices Inc., Jul. 13, 2017.

Elector TV, "Introducing the Resolver", https://www.youtube.com/watch?v=McxtK87Y1Dw, YouTube, May 13, 2022.

PCT Search Report and Written Opinion, PCT/US2025/011439, dated Apr. 24, 2025.

* cited by examiner

INDUCTIVE LONG-RANGE POSITION SENSORS (LR-POS) INTEGRATED ON FLEXIBLE AND RIGID SUBSTRATES

BACKGROUND

Field

The field relates to a position sensor, and in particular, to an inductive long-range position sensor measuring at least one of proximity, linear, angular, and rotary motional positions of a target.

Description of the Related Art

Various methods of measuring linear and rotational distances in long range applications, which can be done with magnets, optics, and ultrasound, may utilize additional components and introduce interference into the system. For example, magnetic sensing solutions utilize additional low hysteresis magnetic circuits, bulky magnets, and a magnetic field concentrator. Accordingly, there remains a continuing need for an apparatus with high linearity, accuracy, and repeatability for long range measurements.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these implementations are intended to be within the scope of the invention herein disclosed. These and other implementations will become readily apparent to those skilled in the art from the following detailed description of the preferred implementations having reference to the attached figures, the invention not being limited to any particular preferred implementations disclosed.

In one implementation, an inductive position sensor can include: a substrate having one or more inductive sensing coils, the inductive sensing coils disposed on or at least partially embedded in the substrate; a non-conductive carrier configured to be shaped to be disposed over or around a target, the substrate disposed on a surface of the non-conductive carrier; and one or more processors configured to process an output signal and determine a distance based at least in part on the processed output signal, the one or more processors electrically connected to the one or more inductive sensing coils, the one or more processors managing an input signal and the output signal, wherein the one or more processors are configured to determine a position of the target.

In some implementations, the substrate includes a flexible substrate, wherein the flexible substrate is non-planar and conforms to the shape of the non-conductive carrier. In some implementations, the substrate is elongated such that a length of the substrate is larger than its width, the inductive position sensor configured to measure linear motion. In some implementations, the substrate is mounted to the non-conductive carrier with one or more mounting posts. In some implementations, a cover surrounds the non-conductive carrier.

In some implementations, the substrate is curved or arched to measure angular rotation. In some implementations, the substrate is positioned around a center axis of rotation of the target. In some implementations, the one or more inductive sensing coils and one or more processors provide an output transfer function that one degree of mechanical angular rotation change of the position of the target generates one degree of electrical angle change at output. In some implementations, the one or more inductive sensing coils and the one or more processors are positioned on the substrate. In some implementations, the one or more inductive sensing coils and the one or more processors are positioned on separate substrates. In some implementations, the inductive sensing coils include primary coils and secondary coils.

In some implementations, the primary coils are transmitting coils and the secondary coils are receiving coils. In some implementations, the primary coils generate an alternating electromagnetic field that couples to the secondary coils. In some implementations, the target interrupts the alternating electromagnetic field coupled between the primary coils and the secondary coils. In some implementations, the one or more inductive sensing coils are configured to be shaped to a surface of the target to maintain an approximately uniform gap between the flexible substrate and the target.

In some implementations, the target includes an electrically conductive moving target configured for tracking an object for measuring a position of the target. In some implementations, the target is mechanically connected to an actuator, the actuator providing movement for the target. In some implementations, the actuator includes an actuator housing, wherein the one or more processors are disposed in the actuator housing. In some implementations, the one or more processors measure at least one of proximity, linear, angular, and rotary motional positions of the target. In some implementations, the processing occurs in a remote location separate from the one or more processors. In some implementations, the processing occurs in multiple locations.

In another implementation, an inductive position sensor can include: a flexible substrate having one or more inductive sensing coils, the inductive sensing coils disposed on or at least partially embedded in the flexible substrate; and one or more processors configured to process an output signal and determine a distance based at least in part on the processed output signal electrically connected to the one or more inductive sensing coils, the one or more processors controlling and managing an input signal and an output signal, wherein the one or more processors are configured to determine a position of a target.

In some implementations, the flexible substrate is elongated such that a length of the flexible substrate is larger than its width, the inductive position sensor configured to measure linear motion. In some implementations, the inductive position sensor includes a non-conductive carrier, wherein the flexible substrate is disposed or configured to be disposed on a surface of the non-conductive carrier. In some implementations, the flexible substrate is non-planar. In some implementations, the flexible substrate is mounted to the non-conductive carrier with one or more mounting posts.

In some implementations, a cover surrounds the non-conductive carrier. In some implementations, the flexible substrate is curved or arched, the inductive position sensor configured to measure angular rotation. In some implementations, the one or more inductive sensing coils and the one or more processors are positioned on the flexible substrate. In some implementations, the one or more inductive sensing coils and the one or more processors are positioned on separate substrates.

In some implementations, the flexible substrate is positioned around a center axis of rotation of the target. In some implementations, the one or more inductive sensing coils and the one or more processors provide an output transfer function such that one degree of mechanical angular rotation change of the target position generates one degree of electrical angle change at output. In some implementations, the inductive sensing coils includes a primary coils and a secondary coils. In some implementations, the primary coils are transmitting coils and the secondary coils are receiving coils. In some implementations, the primary coils generate an alternating electromagnetic field that couples to the secondary coils. In some implementations, the target interrupts the alternating electromagnetic field coupled between the primary coils and the secondary coils.

In some implementations, the one or more inductive sensing coils are configured to be shaped to a surface of the target to maintain an approximately uniform air gap between the flexible substrate and the target. In some implementations, the target includes an electrically conductive moving target configured for tracking an object for measuring a position of the target. In some implementations, the target is mechanically connected to an actuator, the actuator providing movement for the target. In some implementations, the actuator includes an actuator housing, wherein the one or more processors are disposed in the actuator housing.

In some implementations, the one or more processors measure at least one of proximity, linear, angular, and rotary motional positions of the target. In some implementations, the processing can occur in a remote location separate from the processors. In some implementations, the processing occurs in multiple locations.

In another implementation, an inductive position sensor can include: a substrate having one or more inductive sensing coils, the one or more inductive sensing coils disposed on or at least partially embedded in the substrate; and a target including an electrically conductive moving target configured for tracking an object for measuring a position of the target.

In some implementations, the substrate includes a flexible substrate, wherein the flexible substrate is non-planar and conforms to a surface profile of the target. In some implementations, the flexible substrate at least partially encircles the target. In some implementations, the flexible substrate encircles the target. In some implementations, the substrate is elongated such that a length of the substrate is larger than its width, the inductive position sensor configured to measure linear motion.

In some implementations, the inductive position sensor includes a non-conductive carrier. In some implementations, the substrate is disposed on a surface of the non-conductive carrier. In some implementations, the substrate is mounted to the non-conductive carrier with one or more mounting posts. In some implementations, the substrate is curved or arched, the inductive position sensor configured to measure angular rotation. In some implementations, the target is mechanically connected to an actuator including an actuator housing, the actuator providing movement for the target.

In some implementations, the inductive position includes one or more processors in connection with the one or more inductive sensing coils, the one or more processors configured to control and manage an input signal and an output signal to determine a position of the target. In some implementations, the one or more processors measure at least one of proximity, linear, angular, and rotary motional positions of the target. In some implementations, the one or more inductive sensing coils and the one or more processors are positioned on the substrate. In some implementations, the one or more inductive sensing coils and the one or more processors are positioned on separate substrates.

In some implementations, the substrate is positioned around a center axis of rotation of the target. In some implementations, the one or more inductive sensing coils and the one or more processors provides an output transfer function such that one degree of mechanical angular rotation change of the target position generates one degree of electrical angle change at output. In some implementations, the one or more processors are disposed in the actuator housing. In some implementations, the inductive position sensor includes a housing, wherein the housing includes mounting holes configured to secure the inductive position sensor to a surface. In some implementations, the mounting holes are configured for mechanical alignment of the inductive sensing coils in relation to the target. In some implementations, the mounting holes are configured to prohibit movement of the housing.

In some implementations, the target includes any number of paired poles. In some implementations, the target include at least one of one paired-pole (1pp), two paired-poles (2pp), three paired-poles (3pp), four paired-poles (4pp), five paired-poles (5pp), and six paired-poles (6pp). In some implementations, the inductive sensing coils include an annular shape. In some implementations, the inductive sensing coils include a partial section of an annular shape.

In some implementations, the inductive position sensor includes an integrated directional speed sensing unit configured to detect and measure a mechanical angle position, speed, or direction of the target. In some implementations, the inductive sensing coils include primary coils or secondary coils. In some implementations, the primary coils are transmitting coils and the secondary coils are receiving coils. In some implementations, the primary coils generate an alternating electromagnetic field that couples to the secondary coils. In some implementations, the target interrupts the alternating electromagnetic field coupled between the primary coils and the secondary coils. In some implementations, the one or more inductive sensing coils are configured to be shaped to a surface of the target to maintain an approximately uniform air gap between the flexible substrate and the target.

In another implementation, a method of manufacturing an inductive position sensor can include: providing a substrate having one or more inductive sensing coils, the inductive sensing coils disposed on or at least partially embedded in the substrate; mounting the substrate to a non-conductive carrier having one or more mounting posts, the non-conductive configured to be aligned with a surface of a target; and positioning the non-conductive carrier over or around the target.

In some implementations, the substrate includes a flexible substrate, wherein the flexible substrate is non-planar and conforms to a shape of the non-conductive carrier. In some implementations, the method includes bending or deforming the flexible substrate to conform to the shape of the non-conductive carrier. In some implementations, the method includes bending or deforming the flexible substrate into position around a center axis of rotation of the target to measure angular rotation.

In some implementations, the method includes shaping the one or more inductive sensing coils to a surface of the target to maintain an approximately uniform air gap between the substrate and the target. In some implementations, the method includes electrically connecting the substrate to one or more processors, wherein the one or more processors are in communication with the one or more inductive sensing coils, the one or more processors controlling an input signal and an output signal, wherein the one or more processors are configured to determine a position of the target.

In some implementations, the method includes covering the substrate and non-conductive carrier with a cover. In some implementations, the inductive coils include a primary coils and a secondary coils. In some implementations, the primary coils are transmitting coils and the secondary coils are receiving coils. In some implementations, the method includes mechanically connecting the target to an actuator, the actuator providing movement for the target.

In another implementation, a method of measuring a target using an inductive position sensor can include: generating an alternating electromagnetic field between one or more inductive sensing coils along a sensing track, the one or more inductive sensing coils including a transmitting coil and a receiving coil; coupling the alternating electromagnetic field generated by the transmitting coil to the receiving coil; interrupting the alternating electromagnetic field coupled between the transmitting coil and receiving coil with the target; monitoring the position of the target in motion; providing alternating voltages as an output signal as the target is in motion; and outputting a transfer function based at least on a change in position of the target.

In some implementations, the transfer function converts one degree of mechanical angular rotation change of the target position into one degree of electrical angle change at output. In some implementations, the method includes managing the one or more inductive sensing coils with one or more processors. In some implementations, the method includes managing an input signal and the output signal of the one or more inductive sensing coils with the one or more processors.

In some implementations, the one or more inductive sensing coils are disposed on or at least partially embedded in a flexible substrate. In some implementations, the method includes mounting the flexible substrate to a non-conductive carrier having one or more mounting posts, the non-conductive carrier configured to be aligned with a surface of a target and bending or deforming the flexible substrate to conform to a surface of the non-conductive carrier to create an approximately uniform air gap between the flexible substrate and the target.

In another implementation, a linear inductive position sensor configured to measure a linear position of an object can include: a flexible substrate having one or more inductive sensing coils, the one or more inductive sensing coils disposed on or at least partially embedded in the flexible substrate; a target configured for tracking a position of the object, wherein the one or more inductive sensing coils are configured to be shaped to a surface of the target to maintain an approximately uniform gap between the flexible substrate and the target; a non-conductive carrier configured to be shaped to be disposed over or around the target, the flexible substrate disposed on a surface of the non-conductive carrier, wherein the flexible substrate is non-planar and conforms to the shape of the non-conductive carrier; and one or more processors configured to process an output signal and determine a distance based at least in part on the processed output signal, the one or more processors electrically connected to the one or more inductive sensing coils, the one or more processors managing an input signal and the output signal, wherein the one or more processors are configured to determine a position of the target.

In some implementations, the target includes an electrically conductive moving target. In some implementations, the flexible substrate is elongated such that a length of the flexible substrate is larger than its width, the inductive position sensor configured to measure linear motion. In some implementations, the flexible substrate is mounted to the carrier with one or more mounting posts. In some implementations, a cover surrounds the non-conductive carrier.

In some implementations, the one or more inductive sensing coils and the one or more processors are positioned on the flexible substrate. In some implementations, the one or more inductive sensing coils and the one or more processors are positioned on separate substrates. In some implementations, the inductive sensing coils include primary coils and secondary coils. In some implementations, the primary coils are transmitting coils and the secondary coils are receiving coils. In some implementations, the primary coils generate an alternating electromagnetic field that couples to the secondary coils. In some implementations, the target interrupts the alternating electromagnetic field coupled between the primary coils and the secondary coils.

In some implementations, the target is mechanically connected to an actuator, the actuator providing movement for the target. In some implementations, the actuator includes an actuator housing surrounding the actuator, wherein the one or more processors are disposed in the actuator housing. In some implementations, the processing occurs in a remote location separate from the one or more processors. In some implementations, the processing occurs in multiple locations. In some implementations, the one or more processors are configured for at least one of controlling, programming, calibrating, computing and compensating algorithms, storing data, and reporting measurement data in analog or digital formats. In some implementations, the linear inductive position sensor includes an integrated directional speed sensing unit configured to detect and measure a motion, speed, or direction of the target.

In another implementation, an angular inductive position sensor configured to measure a low-speed and high-speed linear angle measurement of an object can include: a substrate having one or more inductive sensing coils, the inductive sensing coils disposed on or at least partially embedded in the substrate, wherein the one or more inductive sensing coils are positioned on a circular-shaped portion on a first end of the substrate; a target configured for tracking a position of the object; and one or more processors positioned on a second end of the substrate and configured to process an output signal and determine a distance based at least in part on the processed output signal, the one or more processors electrically connected to the one or more inductive sensing coils, the one or more processors managing an input signal and the output signal, wherein the one or more processors are configured to determine a position of the target.

In some implementations, the target includes an electrically conductive moving target. In some implementations, the substrate includes a flexible substrate and a rigid substrate, wherein the flexible substrate is non-planar. In some implementations, the flexible substrate at least partially encircles the target. In some implementations, the flexible substrate encircles the target. In some implementations, the substrate is curved or arched, the inductive position sensor configured to measure angular rotation.

In some implementations, the one or more inductive sensing coils and the one or more processors provide an output transfer function that one degree of mechanical angular rotation change of the target position generates one degree of electrical angle change at output. In some implementations, the one or more inductive sensing coils and the one or more processors are positioned on the substrate. In some implementations, the one or more inductive sensing coils and the one or more processors are positioned on the flexible substrate. In some implementations, the one or more inductive sensing coils and the one or more processors are positioned on separate substrates.

In some implementations, a portion of the substrate is positioned around a center axis of rotation of the target. In some implementations, the flexible substrate is positioned around a center axis of rotation of the target. In some implementations, the one or more inductive sensing coils and one or more processors provide an output transfer function that one degree of mechanical angular rotation change of the position of the target generates one degree of electrical angle change at output.

In some implementations, the inductive sensing coils include a primary coils and a secondary coils. In some implementations, primary coils are transmitting coils and the secondary coils are receiving coils. In some implementations, the primary coils generate an alternating electromagnetic field that couples to the secondary coils. In some implementations, the target interrupts the alternating electromagnetic field coupled between the primary coils and the secondary coils. In some implementations, the one or more inductive sensing coils are configured to be shaped to a surface of the target to maintain an approximately uniform gap between the flexible substrate and the target.

In some implementations, the target includes an electrically conductive moving target configured for tracking an object for measuring a position of the target. In some implementations, the target is mechanically connected to an actuator, the actuator providing movement for the target. In some implementations, the one or more processors measure at least one of proximity, angular, and rotary motional positions of the target. In some implementations, the processing occurs in a remote location separate from the one or more processors. In some implementations, the processing occurs in multiple locations.

In some implementations, the angular inductive position sensor includes including a housing, wherein the housing includes mounting holes configured to secure the inductive position sensor to a surface. In some implementations, the mounting holes are configured for mechanical alignment of the inductive sensing coils in relation to the target. In some implementations, the mounting holes are configured to prohibit movement of the housing. In some implementations, the target includes any number of paired poles. In some implementations, the target include at least one of one paired-pole (1pp), two paired-poles (2pp), three paired-poles (3pp), four paired-poles (4pp), five paired-poles (5pp), and six paired-poles (6pp).

In some implementations, the inductive sensing coils include an annular shape. In some implementations, the inductive sensing coils include a partial section of an annular shape. In some implementations, the angular inductive position sensor to 136 includes an integrated directional speed sensing unit configured to detect and measure a mechanical angle position, speed, or direction of the target.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
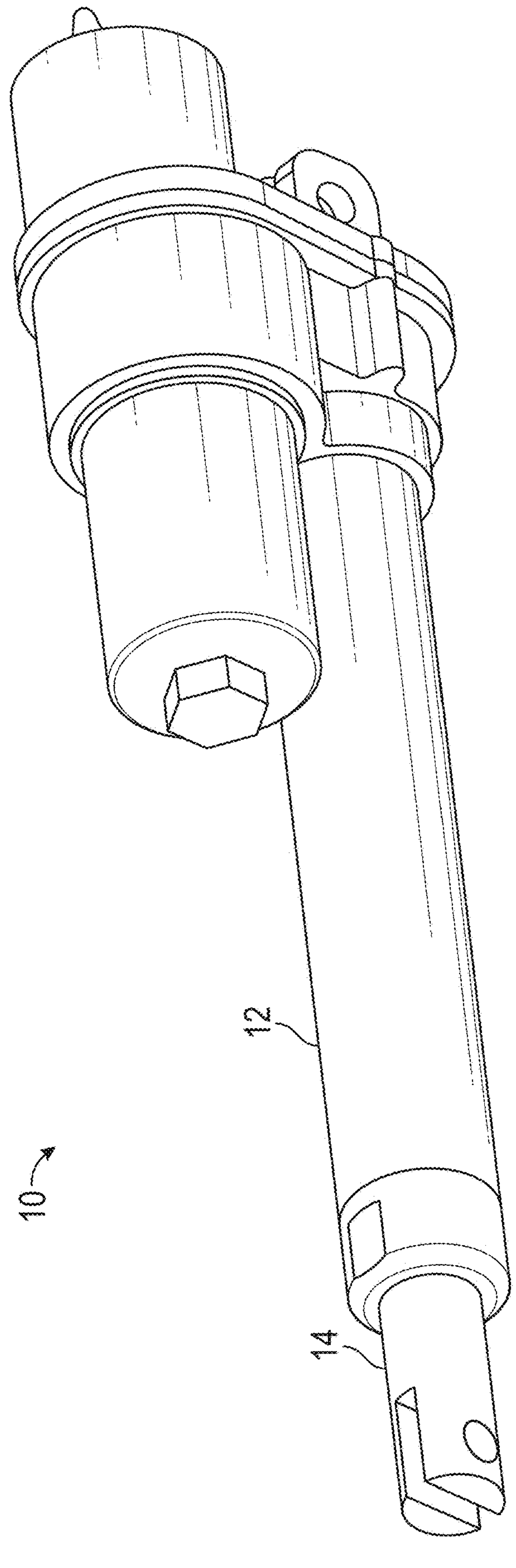
FIG. 1 is an example linear device in which an inductive position sensor can be integrated within a linear track.

Although several implementations, examples, and illustrations are disclosed below, it will be understood by those of ordinary skill in the art that the inventions described herein extend beyond the specifically disclosed implementations, examples, and illustrations and includes other uses of the inventions and obvious modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments can comprise several novel features. No single feature is solely responsible for its desirable attributes or is essential to practicing the inventions herein described.

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of implementations.

Overview

This disclosure relates to an inductive position sensors that can be integrated on flexible and/or rigid substrates and used in various linear or rotary devices, such as actuators and motors, to measure the linear position of a shaft with a large stroke and/or the angular position of a rotary shaft having a large radius. An inductive long-range position sensor can be used to continuously monitor, detect, track, measure, and report in real-time the positions of an electrically conductive target connected to a moving mechanical part within a system undergoing a test and/or measurement. The inductive long-range position sensor can use inductive sensing technology to measure the proximity, linear, angular, and/or rotary motional positions of a moving target. Inductive sensing uses the principles of electromagnetic induction to detect and/or measure the presence of conductive or metallic objects without physical contact. This sensing technique relies on the interaction between a coil or an inductor and the target object. A coil and/or inductor generates an electromagnetic field when an alternating current (AC) is passed through it. When a conductive and/or metallic object enters the proximity of the coil and/or inductor, the object interacts with the electromagnetic field and induces eddy currents in the object. Eddy currents are circulating currents that flow within the conductive material. The presence of the conductive object alters the inductance of the coil. Inductance is a property of an electrical circuit that measures the ability of a coil to store energy in a magnetic field. The change in inductance is then detected and used as a signal to determine the presence or properties of the target object. The signal generated by the inductive sensing system is processed and analyzed to extract relevant information, such as the position, size, shape, or material of the detected object.

The inductive position sensor herein can be identified as long-range (LR) since the sensor is capable of measuring from short to very long distance during the scanning of an object and/or target over a sensing track integrated within a large linear or a large radius rotary system. The sensing track can include transmitting and receiving coils constructed on a rigid (e.g., FR-4, Ceramic) and/or flexible (e.g., polymers like polyimide film, Polyester, polyethylene terephthalate (PET)) substrate materials. The transmitting and/or receiving coil signals are managed and/or processed by an Electronic Signal Processing Unit (ESPU). The ESPU can be a smart signal management unit with the capability of controlling, programming, calibrating, computing and compensation algorithms, data storage, and reporting measurement data in an analog and/or digital format.

Figure 2B:
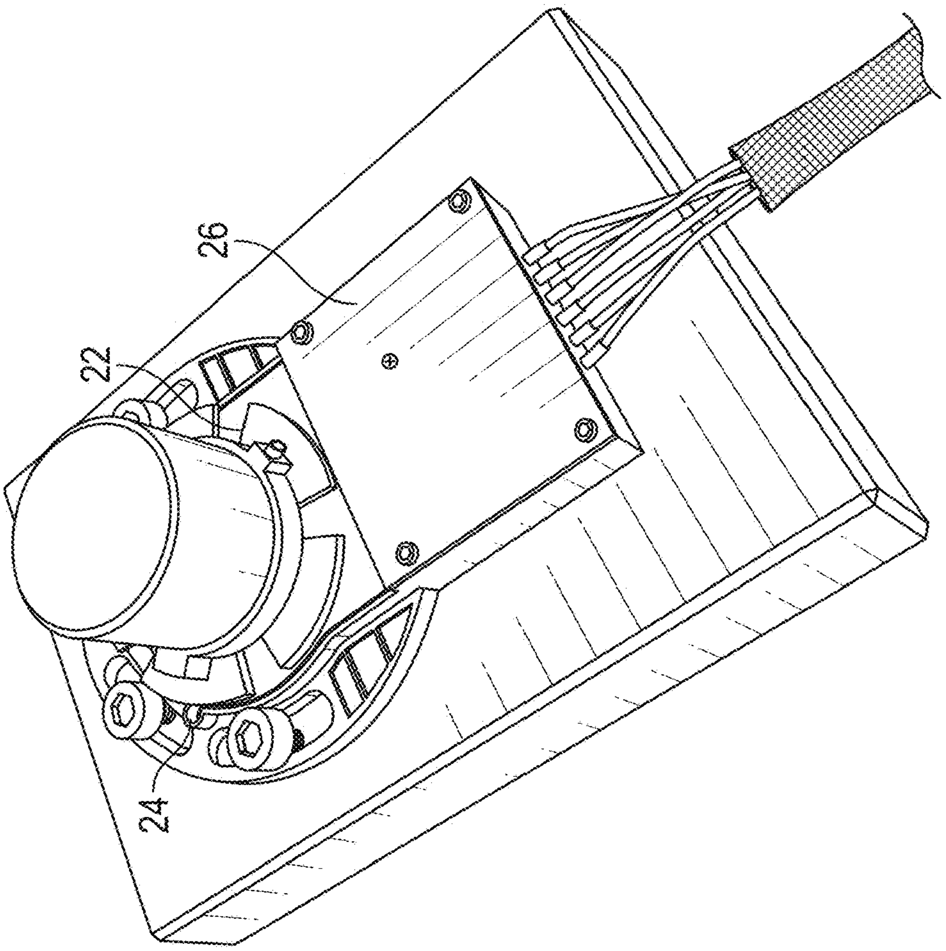
FIGS. 2A-2B are example rotary device in which an inductive position sensor can be integrated within an arc and/or curved track.
Figure 2A:
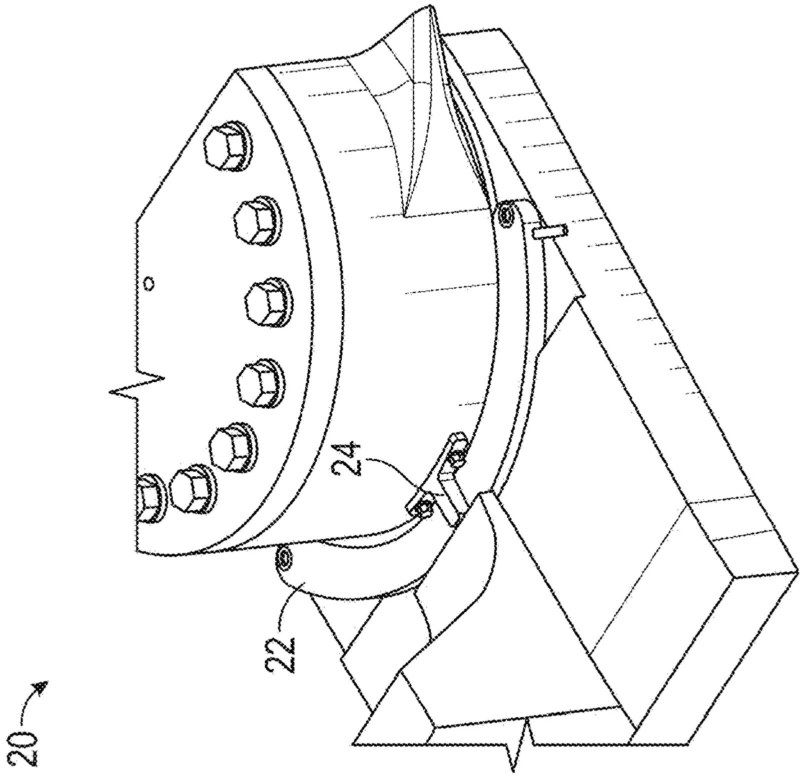

For example, FIG. 1 illustrates an exemplary linear device 10 in which an inductive position sensor (not shown) can be integrated along a linear track 12, and FIGS. 2A and 2B illustrate an exemplary rotary device 20 in which an inductive position sensor can be integrated within an arc and/or curved track 22. In both examples, positions of a metallic moving target 14, 24 can be monitored, tracked, and/or measured by a processor 26 (e.g., an electronic signal processing unit (ESPU)) while the moving target 14, 24 scans over a large length of a track (e.g., linear track 12 and/or arc and/or curved track 22) containing the inductive sensing elements (also mentioned herein as "inductive sensing coils"). The inductive sensing elements and processor can be provided on (e.g., patterned in or on) flexible and/or rigid substrates and built into the linear and/or arc-shaped track, and ultimately integrated and packaged in a final application like a linear actuator and/or a rotary system.

As mentioned above, the inductive position sensors are capable of measuring a wide-range of motions with high linearity, accuracy, resolution, repeatability, and sensitivity as required for various applications. The wide-range of motions over a linear (i.e., on a long-length straight-line) or angular/rotary (i.e., with a large radius of long-length arc/curve) track. One of many advantages of the inductive LR-POS is the capability of integration of the sensing elements and/or the processors (e.g., ESPU) on a flexible substrate (e.g., a flexible printed circuit board, Flex-PCB) allowing the device to be used in more applications. The flexible substrate can allow for reshaping of the inductive sensor elements to match the surface profile of the conductive moving target (CMT) in order to operate at an approximately uniform air gap for better device performance and accuracy. The flexible substrate can also allow one to design the sensing elements on any irregular curve-shaped of a track rather than a straight or circular shape.

The customized sizing of the sensing elements integrated onto a rigid and/or flexible substrate (e.g., printed circuit board (PCB)) can extend the applicability of the inductive LR-POS to a wide range of applications such as actuators, motors, steering and transmission gear shifts, chassis levels, valves, liquid levels, etc. For instance, in actuator and motor applications, the flexible substrate of the inductive LR-POS can allow the sensing elements to be reshaped/curved above the conductive moving target (shaft) to generate signals with higher accuracies as compared to a flat and/or rigid substrate.

The flexible inductive position sensors can be used in any industries where the position measurements are used such as automotive, agricultural machinery, medical equipment, tests, and lab equipment and so on. Also, the applications of the flexible inductive position sensors is not limited to the examples here; the flexible inductive position sensors can be used in any other position sensing applications such as level-meters, force-meters, and so on.

As the hysteresis, repeatability, sensitivity, and linearity can be important parameters of a design for any sensing technology, the inductive position sensors can also be used for high-performance motion sensor by minimizing the error sources coming from the electromagnetic sensing circuit in conjunction with moving target in mechanical assembly. A proper electromagnetic and mechanical system design (inductive sensing elements, target, and processor) of an inductive position sensor integrated on a flexible substrate leads to a high-performance measuring device for a long-range motion applications. The designs of the flexible inductive sensing elements and the target in an inductive position device can play important roles in the accuracy of the device while the processor design and specifications can provide the better resolution, stability, signal to noise ratio, and overall performance of the measuring device as desired in application to meet the targeted electromechanical and environmental requirements.

Depending on the designs of the inductive sensing elements and the processor, the inductive position sensors generally can provide accurate and precise measurements with low temperature drift. The inductive position sensors can have a noise immunity with active rejection of stray magnetic fields, high linearity, high accuracy and repeatability, no magnetic hysteresis, near-zero offset, and stability at output signal with stability after calibration.

The inductive position sensors can be a low-cost solution for long-range motion applications with inexpensive metallic targets compared with magnetic sensing solutions utilizing a design of low hysteresis magnetic circuits including magnet and structural materials. Magnetic sensors for long-range motion measurements usually incorporate a large and bulky expensive magnet as well as magnetic field concentrator which bring not only complexity and high cost in design, but also difficulties in maintaining the same operating performance over the life cycle of the sensor. The inductive position sensors can operate on alternative electromagnetic field principles, for example, at a certain frequency within of 1-6 MHz range with potential immunity against stray magnetic fields which makes the device more compatible in applications with any magnets nearby.

The processor hardware can be programmed for different linear and angular/rotary position measuring applications. Different applications may utilize different inductive sensing element layout designs customized to operate with a specific target. The processor can be designed and integrated along with the inductive sensor elements (ISC) on a same rigid or flexible substrate.

The flexibility of reshaping a flexible substrate allows the inductive sensing elements to be mounted in any orientation on flat and/or curved/non-planar surfaces, expanding the number of applications for the inductive position sensor integrated on a flexible substrates such as long-stroke actuators and motors with large-radius rotating shaft.

Like other technologies, the inductive long range positions sensor (LR-POS) device may also have some limitations in applications such as proximity of any other surrounding metallic parts (beside the main CMT) moving close by the ISC, as it may effect device performance and generate errors in measurements.

Example Implementations of Linear Inductive Position Sensors

Figure 3:
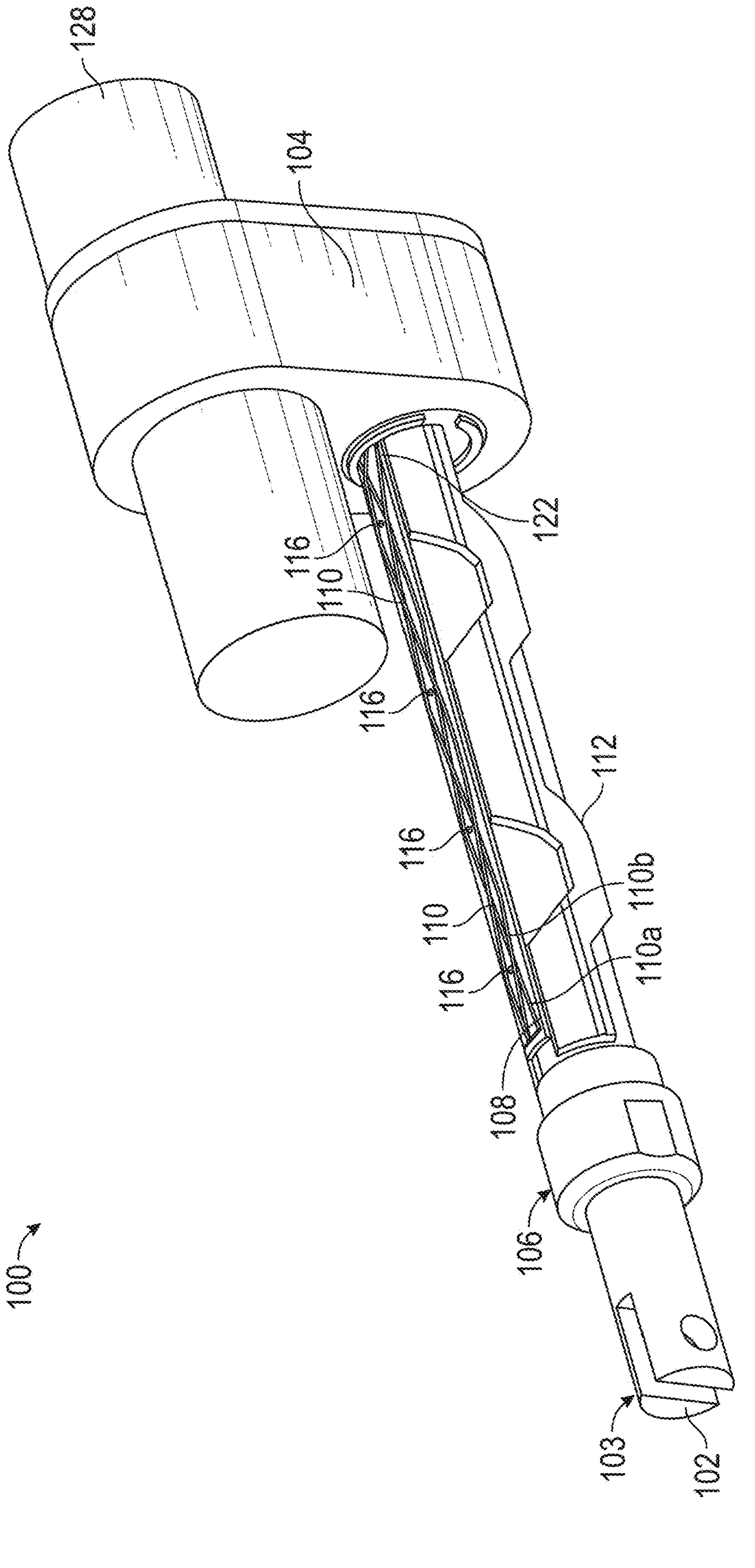
FIG. 3 is a schematic perspective view of an inductive position sensor that includes a flexible substrate, according to various implementations.

FIG. 3 illustrates a schematic perspective view of an inductive long-range position sensor 100 configured to continuously monitor, detect, track, measure, and/or report in real time the positions of an electrically conductive moving target 102 (CMT; also mentioned herein as a "target"). The target 102 can be connected to a mechanical part 104, such as an actuator and/or motor, to provide movement to the target 102. A mechanical part housing 128 can house the mechanical part 104 (e.g., actuator housing). The inductive position sensor 100 can be identified as LR (Long-Range) since the inductive position sensor 100 is capable of measuring from short to very long distance scanning of the target 102 over a linear sensing track 106 integrated within a large linear system in a linear actuator system. The inductive position sensor 100 can include a flexible substrate 108 having one or more inductive sensing coils 110 (e.g., primary coils 110*a* and secondary coils 110*b*). The inductive sensing coils 110 can be disposed on or at least partially embedded in the flexible substrate 108. A non-conductive carrier 112 can be configured to be shaped and/or to be disposed over or around the target 102. The flexible substrate 108 can disposed along a surface 103 (i.e., surface profile) of the non-conductive carrier 112 at least partially surrounding the linear sensing track 106. The inductive position sensor 100 can further include one or more processors 122 configured to process an output signal and determine a distance based at least in part on the processed output signal. The one or more processors 122 can be electrically connected to the one or more inductive sensing coils 110. The one or more processors 122 can manage an input signal and the output signal and determine a position of the target 102. The inductive position sensor 100 can be used to measure at least one of proximity and linear positions of the target 102. The inductive position sensor 100 can be identified as non-contact smart position sensing devices used in applications where long-range motion measurements are required.

Figure 4:
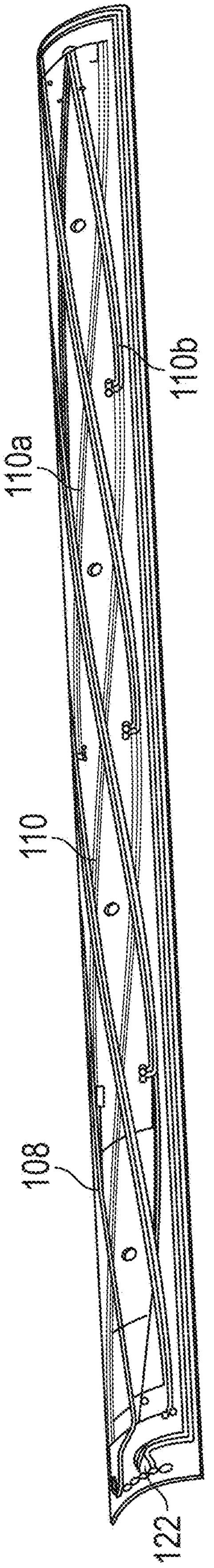
FIG. 4 is a schematic perspective view of a flexible substrate to be used in the inductive position sensor of FIG. 3, according to various implementations.

FIG. 4 illustrates a perspective view of a flexible substrate 108 to be used by the inductive position sensor 100 having a non-planar target. The flexible substrate can refer to a material and/or base layer that can bend, fold, and/or conform to various shapes without losing its structural integrity. A flexible substrate can be used as the foundation for flexible PCBs in an electronic component. The flexibility of the substrate can allow the electronic components to be mounted on a surface that can bend and/or flex, enabling the creation of devices that can conform to non-planar surfaces or undergo deformation. The flexible PCB can include a polymer, such as polyimide, as a base layer. The flexible substrate of the transducer can have a Young's modulus (i.e., elastic modulus) that is less than other PCB materials such as FR-4 (i.e., more flexible). The Young's modulus is a material property that describes stiffness and is defined as the ratio of stress to strain within the elastic limit. The Young's modulus of a flexible substrate (e.g., printed circuit board (PCB)) can depend on the materials used in its construction. Flexible PCBs can be made with materials such as polyimide, which is known for its flexibility. The Young's Modulus of polyimide can be in the range of 2 to 4 GPa as compared to 35 to 40 GPa for FR-4 used in rigid PCBs. The transducer can further have a flexural modulus (i.e., a measure of a material's resistance to deformation under applied bending stress that characterizes a material's stiffness in flexural or bending loading conditions) that is less when compared to other PCB materials such as FR-4. When a material is subjected to a bending force, it undergoes deformation, and the flexural modulus quantifies how much the material will deform under this stress. For example, the flexural modulus of polyimide can be 2 to 4 GPa which is less than 14 to 20 GPa of FR-4.

Figure 8:
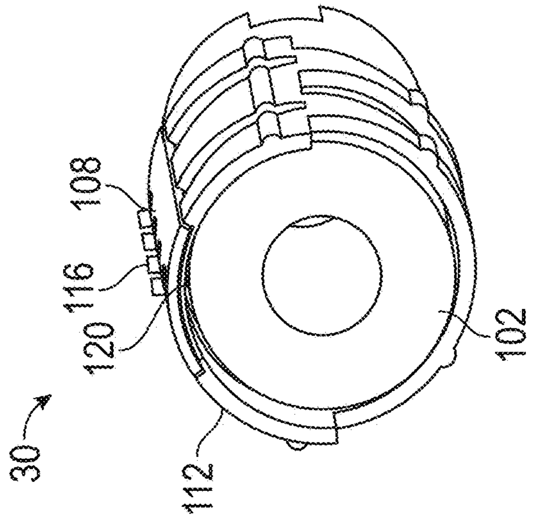
FIG. 8 is a schematic perspective view of an assembly of the inductive position sensor of FIGS. 3-7, according to various implementations.

The flexible substrate 108 can comprise a compliant and/or flexible insulating material with embedded conductors. In some implementations, the insulating material comprises an organic insulating material, such as a polymer (e.g., polyimide). The conductors can comprise copper, aluminum, or other suitable metal. The flexible substrate 108 can be mounted along the linear sensing track 106 of the inductive position sensor 100. The flexible substrate 108 can include the one or more inductive sensing coils 110 disposed on or at least partially embedded in the flexible substrate 108. As shown in FIG. 8, the flexible substrate 108 can allow for the reshaping of the one or more inductive sensing coils 110 to match a surface profile 103 of the target 102, creating an approximately uniform air gap 120 between the target 102 and the one or more inductive sensing coils 110 for better performance and accuracy. By reshaping the flexible substrate 108 and the one or more inductive sensing coils 110 to the surface profile 103, the approximately uniform air gap 120 (see, e.g., FIG. 8) can be maintained during the relative motions between the target 102 and the one or more inductive sensing coils 110. For example, the approximately uniform air gap 120 can be maintained at a distance between 0.1 mm to 10 mm, at a distance between 0.25 mm to 7.5 mm, at a distance between 0.5 mm to 5 mm, at a distance between 0.75 mm to 2.5 mm, at a distance between 0.9 mm to 1.25 mm, or at 1 mm around the target 102. By having an approximately uniform air gap 120, stability in electromechanical characteristics and parameters required for proper operations can be maintained resulting in better performance and higher accuracy of the inductive position sensor 100.

The flexible substrate 108 can also allow the one or more inductive sensing coils 110 to be placed on an irregular curve-shaped track rather than on a straight and/or circular shape. The flexible substrate 108, partly because of its flexibility, can conform to curves and/or non-planar surfaces to position the one or more inductive sensing coils 110 for accurate readings of the distance traveled by the target 102. The flexible substrate 108 can be comprised of polymers and/or polyimide materials like polyimide film, Polyester, and/or polyethylene terephthalate (PET). The one or more inductive sensing coils 110 can be comprised of primary coils 110*a* and secondary coils 110*b*. In some implementations, the primary coils 110*a* can be exciting and/or transmitting coils and the secondary coils 110*b* can be pick up and/or receiving coils. The inductive position sensor 100 can also include one or more processors 122 (e.g., an electronic signal processing unit (ESPU)) to process an output signal and determine a distance based at least in part on the processed output signal. The one or more processors 122 can be a microcontroller-based electronic unit with signal processing capabilities as well as certain digital and analog input and output interfaces. The flexible substrate 108 can also help to reshape the one or more inductive sensing coils 110 to properly attach to any regular or irregular surface profile 103 of the path being scanned by the target 102 motions.

The flexible substrate 108 can be reshaped to mount in certain orientations for side and end scanning of the target 102 as needed in some applications such as actuators and motors presented as examples in this application. In summary, the one or more inductive sensing coils 110 can be designed, built, and/or reshaped in any regular and/or irregular shapes of the linear sensing track 106 being scanned by the target 102.

Figure 5:
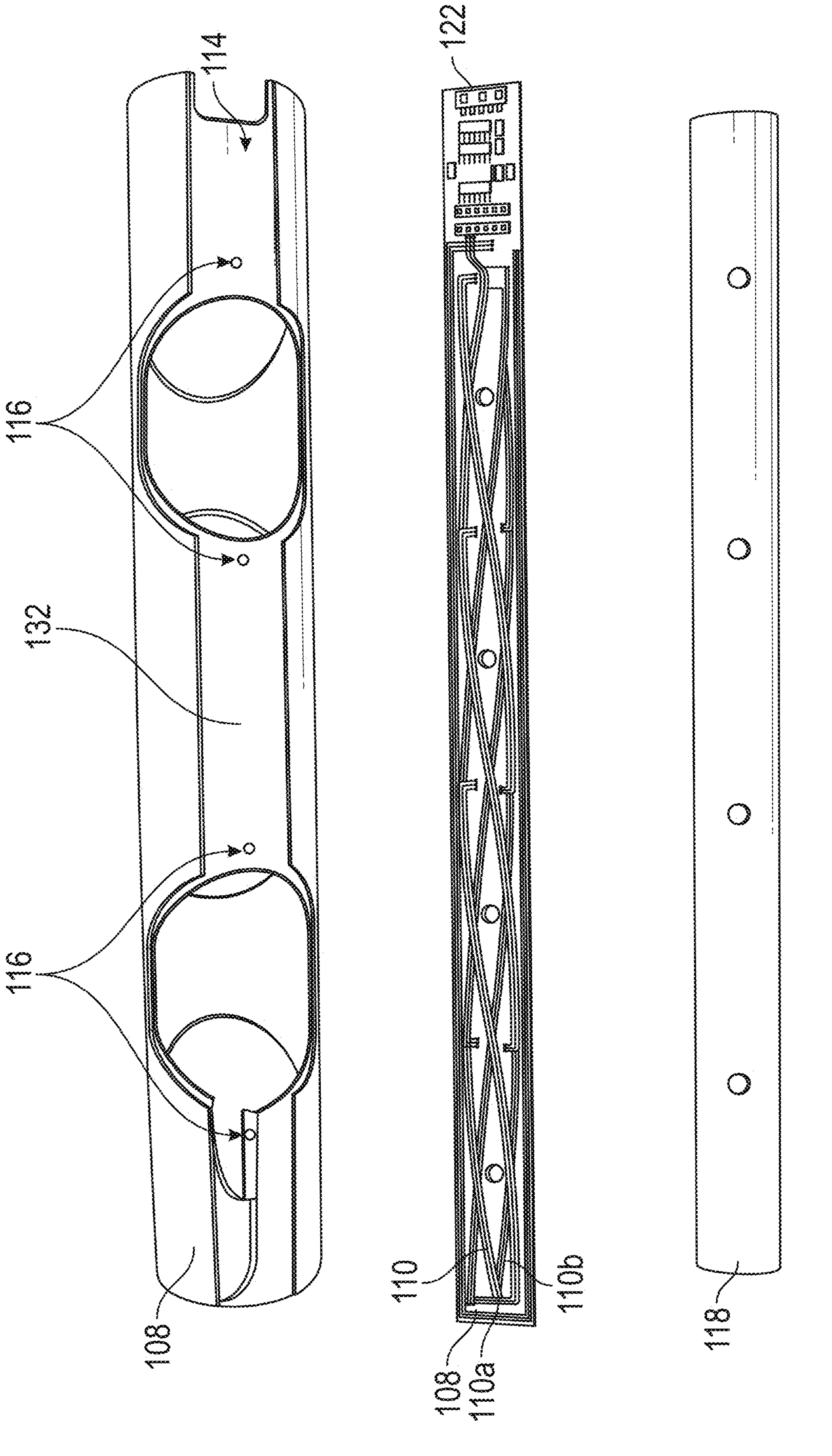
FIGS. 5-7 are schematic perspective views of a non-conductive carrier and flexible substrate to be used in the inductive position sensor of FIG. 3, according to various implementations.
Figure 6:
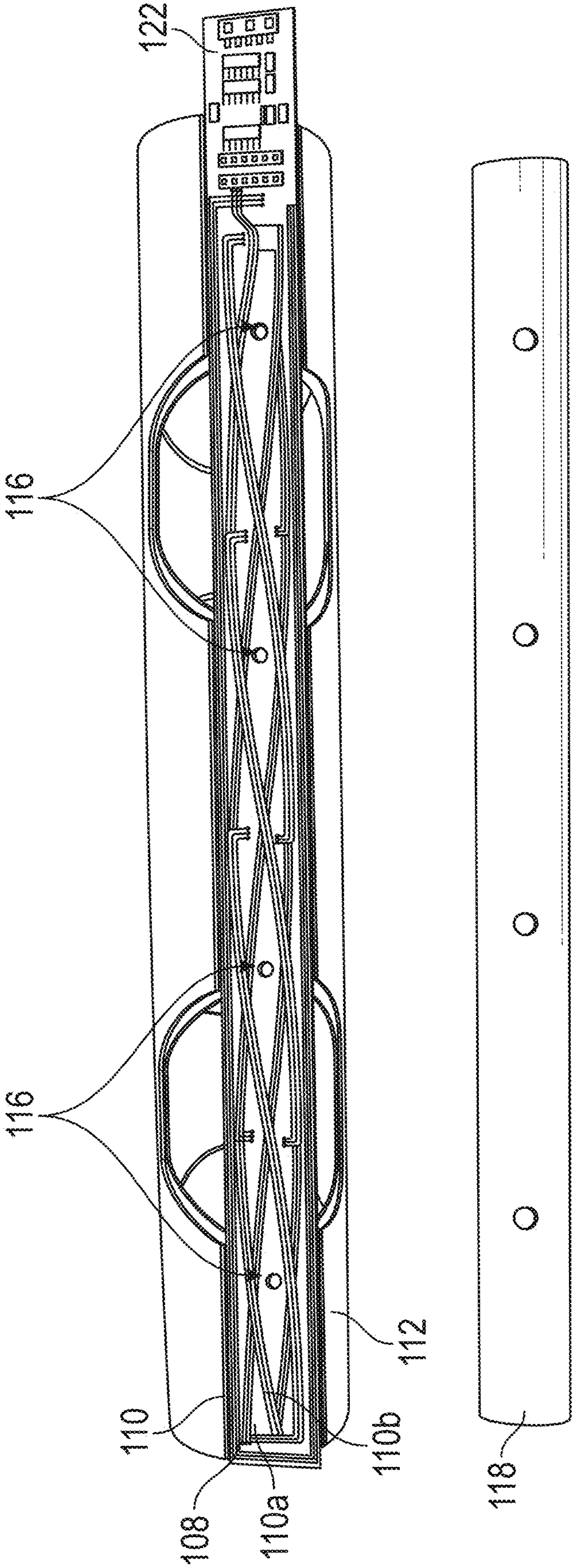

FIG. 5 illustrates a perspective top view of a disassembled non-conductive carrier 112 and the flexible substrate. The inductive position sensor 100 can include a non-conductive carrier 112 shaped to be disposed over and/or around a target 102. The non-conductive carrier 112 can be of a non-conductive material such as hard plastics PET and/or Acrylonitrile Butadiene Styrene (ABS). The flexible substrate 108 can be disposed on a surface 114 of the non-conductive carrier 112. In some implementations, the non-conductive carrier 112 can include a recess 132 along the surface 114 in which the flexible substrate 108 is positioned in. Additionally or alternatively, as shown in FIG. 6 depicting a partially assembled non-conductive carrier 112 and flexible substrate, the flexible substrate 108 can be mounted to the non-conductive carrier 112 using one or more mounting posts 116 disposed on the surface 114 of the non-conductive carrier. Further, the flexible substrate 108 can be bonded to the non-conductive carrier 112, for example, with an adhesive.

Figure 7:
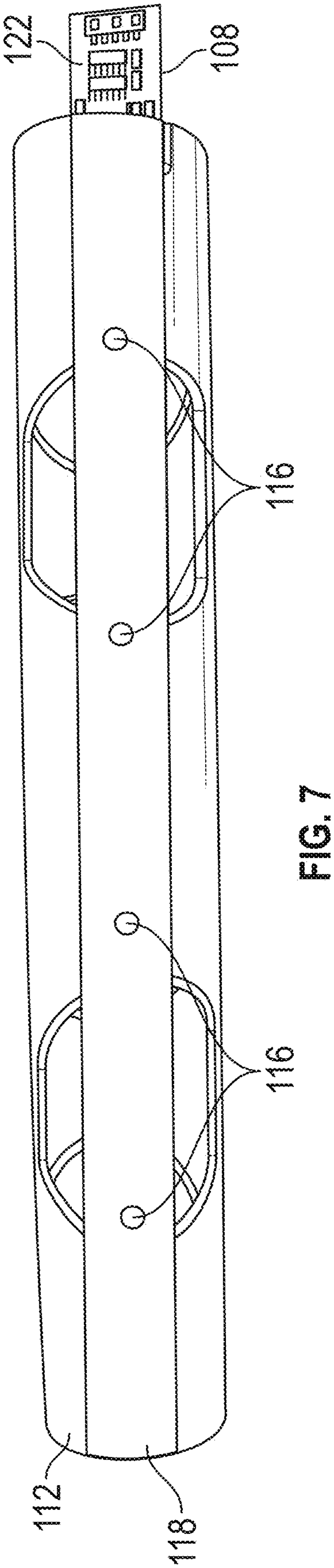

The flexible substrate 108 can be non-planar and conform to the shape (e.g., round, curved, angular, tapered, etc.) of the non-conductive carrier 112. The flexible substrate 108 can be bent and/or deformed in a manner corresponding to the surface 114 of the non-conductive carrier 112. In some implementations, the flexible substrate 108 can be planar and tangent to a surface of the target 102 and/or the non-conductive carrier 112. A non-conductive cover 118, as shown in FIG. 7 illustrating an assembled non-conductive carrier 112 and flexible substrate 108, can be used conform the flexible substrate 108 to the shape of the non-conductive carrier 112. By conforming the flexible substrate 108 to the shape of the non-conductive carrier 112 and the target 102, the inductive position sensor 100 can perform better sensor reading and have better accuracy than a rigid substrate as discussed below. The flexible substrate 108 and non-conductive carrier 112 can then be mounted around and/or over the target 102.

Figure 10:
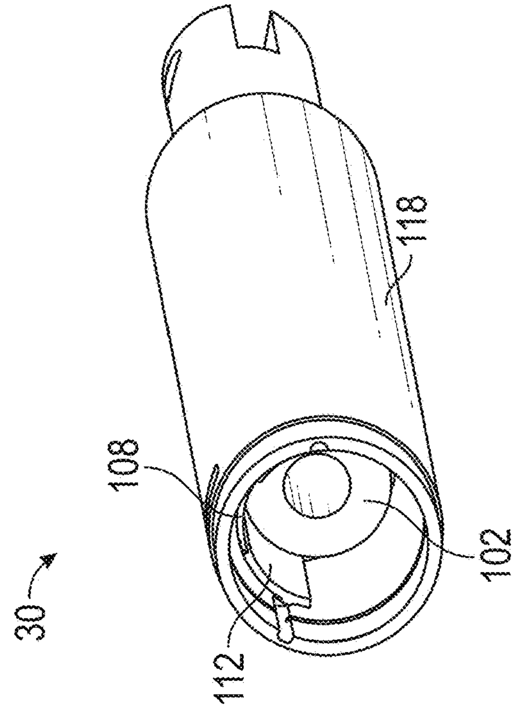
FIG. 10 is a perspective view of the assembly of FIGS. 8 and 9 that includes a cover.
Figure 9:
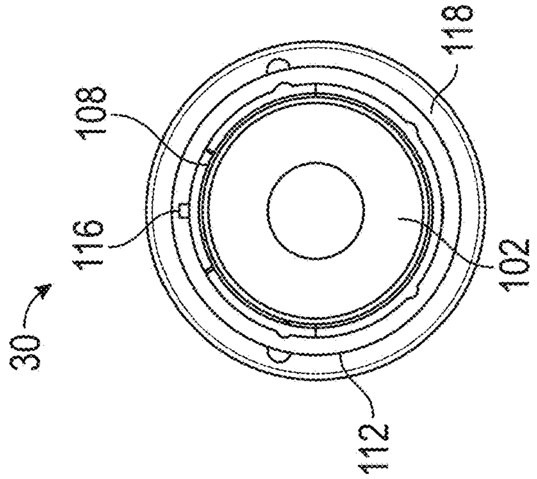
FIG. 9 is a schematic side plan view of the assembly of FIG. 8.

FIG. 8 illustrates a schematic perspective view of an assembly 30 of the flexible substrate 108 mounted to the non-conductive carrier 112 surrounding the target 102. FIG. 9 illustrates a side view of the assembly 30 of FIG. 8 with cover 118 further surrounding the flexible substrate 108, the non-conductive carrier 112, and the target 102. FIG. 10 illustrates a perspective view of the assembly 30 of FIG. 9 of the cover 118 surrounding the flexible substrate 108, the non-conductive carrier 112, and the target 102.

In some implementations, the flexible substrate 108 can be elongated such that the length L of the flexible substrate 108 is larger than its width W. For example, the ratio of length L to width W can be 2:1 to 50:1, 2:1 to 20:1, 2:1 to 10:1, 3:1 to 20:1, 3:1 to 10:1, 4:1 to 20:1, 4:1 to 10:1, etc. In some implementations, a cover 118 can surround at least one of the flexible substrate 108, the non-conductive carrier 112, and/or at least a portion of the target 102. The cover 118 can comprise a hollow tube used to cover the flexible substrate 108 and non-conductive carrier 112.

The one or more inductive coils 110 can be managed and processed by one or more processors 122 which controls and manages the inputs and outputs signals. The one or more processors 122 can be a smart signal management unit with the capability of controlling, programming, calibrations, computing and compensation algorithms, data storage, and reporting measurement data in analog and/or digital formats. The one or more processors 122 can disposed on the flexible substrate 108 and/or separately on another substrate. In some implementations, the one or more processors 122 can be disposed on the surface 114 of the non-conductive carrier 112. In some implementations, the processing can occur in one or more processors 122 in a remote location separate from the inductive position sensor 100. In some implementations, the one or more processors 122 can be disposed in a mechanical part housing 128 of the mechanical part 104. Additionally or alternatively, the processing can occur in multiple locations which can provide redundancy and assist in accuracy.

One or more processors 122 can be electrically connected and/or wireless connected to the one or more inductive sensing coils 110 such that the one or more processors 122 is managing an input signal and the output signal to determine a position of the target 102. The one or more processors 122 can excite the primary coils 110*a* to generate an Alternating Electromagnetic Fields (AEMF) which then couples onto secondary coils 110*b* and produces alternating voltages as the output sensing signals. As the target 102 moves through and interrupts the generated AEMF field, the target 102 causes a disturbance and the voltage induced in the secondary coils 110*b* alter as the target 102 changes position relative to the one or more inductive sensing coils 110. In some implementations, the one or more processors 122 can also monitor an internal and/or external temperature sensor to dynamically measure the temperature changes affecting device functionalities of the inductive position sensor 100 for compensations. The one or more processors 122 may apply temperature compensation algorithm in calculations to provide more accurate measurements to improve device performance.

The one or more inductive sensing coils 110 of the inductive position sensor 100 can be customized for measuring a short to very long-range of motions of the target 102. The sensing range and performance of the inductive position sensor 100 can depend on the designs and sizes of the one or more inductive sensing coils 110 and/or target 102, material of the target 102, and/or the precision of the one or more processors 122. Integration and mounting of the one or more inductive sensing coils 110 in a position measuring system is always a challenge. The measurement accuracy and sensing performance can be directly related to the one or more inductive sensing coils 110 and the target 102 electromechanical characteristics. The irregular shape of the surfaces or locations to mount the one or more inductive sensing coils 110 and targets 102 can determine the relative motions between the one or more inductive sensing coils 110 and the target 102 and consequently defines the performance of the sensing system and accuracy of the measuring position. Therefore, a flexible substrate to integrate the one or more inductive sensing coils 110 and/or one or more processors 122 becomes important in inductive position sensing, particularly in long-range position measuring systems.

Figure 11:
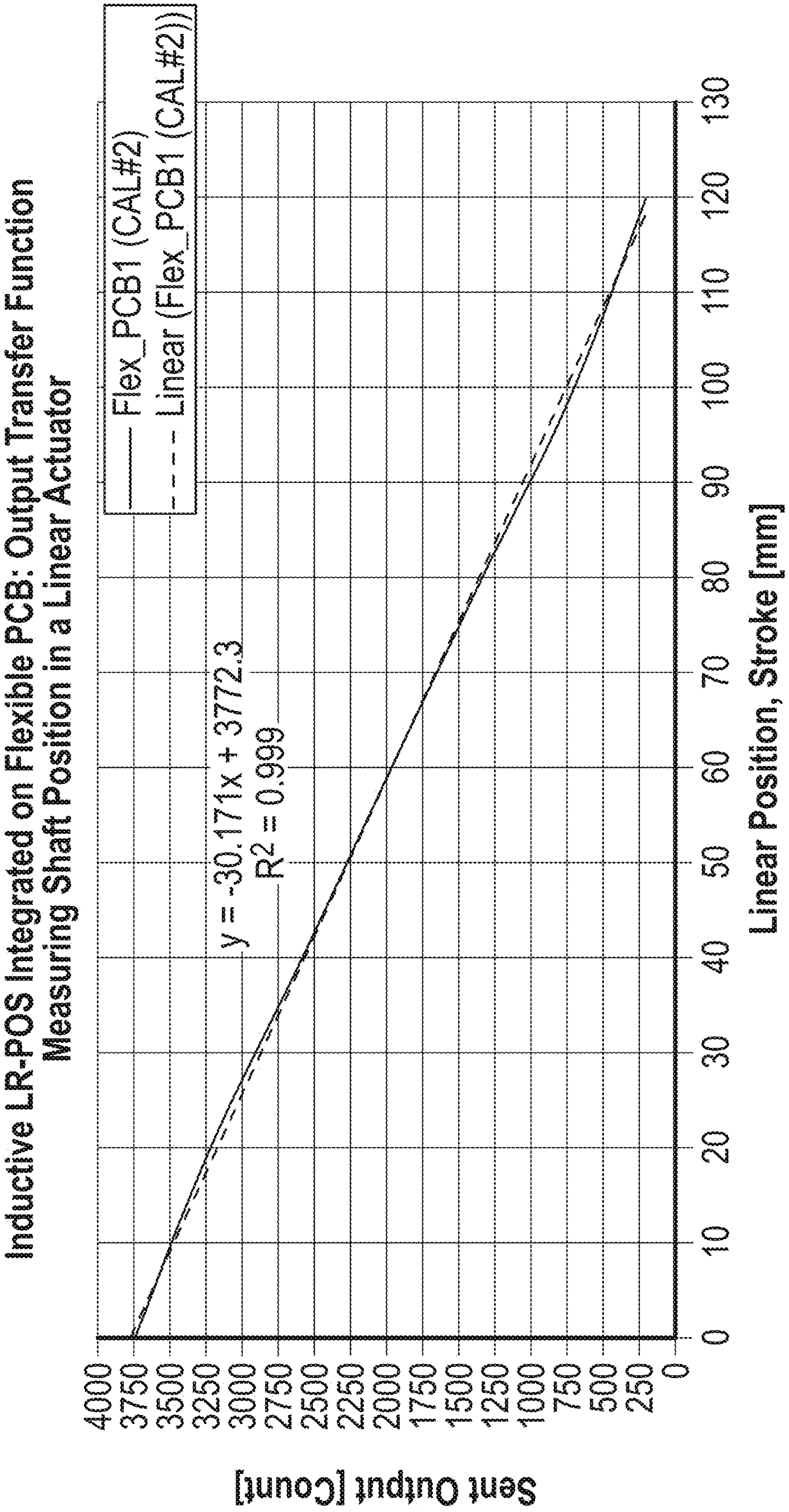
FIG. 11 is a graph that shows a linear transfer function of the inductive position sensor of FIG. 4, according to various implementations.

FIG. 11 is a graph demonstrating the linear transfer function of an exemplary inductive position sensor, similar to inductive position sensor 100, measuring the position of a target. The input is mechanical position change of the target in millimeters, and the output is in a digital format [SENT; Single Edge Nibble Transmission] with a resolution of 12-bits. The test results demonstrate a measuring of linearity over the full-scale stroke of the mechanical part 104, as well as better accuracy and linearity compared to the device integrated on a FR-4 PCB as demonstrated in FIG. 15. The improvement in accuracy and linearity can be attributed to the scanning of the arc-shaped inductive coils of a flexible substrate at the approximately uniform air gap.

Figure 12:
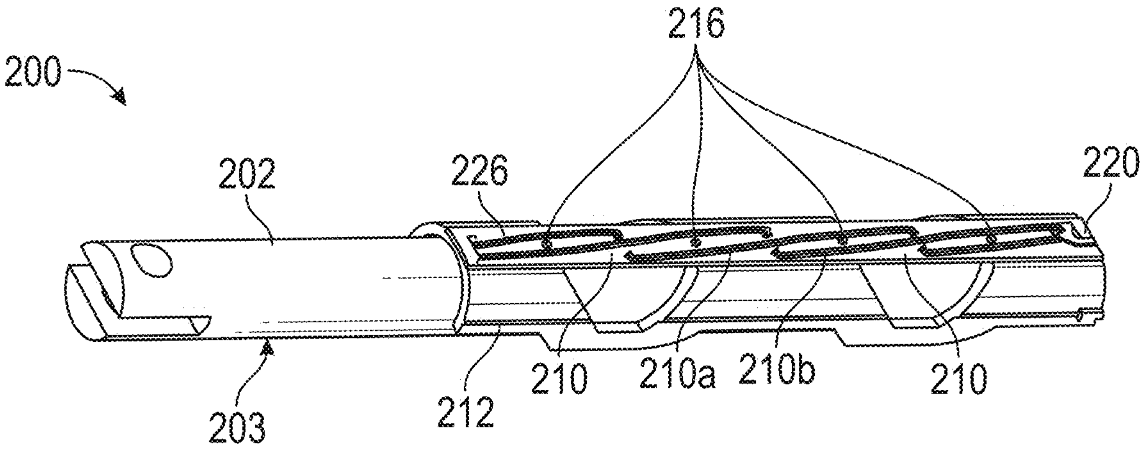
FIG. 12 is a schematic perspective view of an inductive position sensor that includes a rigid substrate, according to various implementations.
Figure 13:
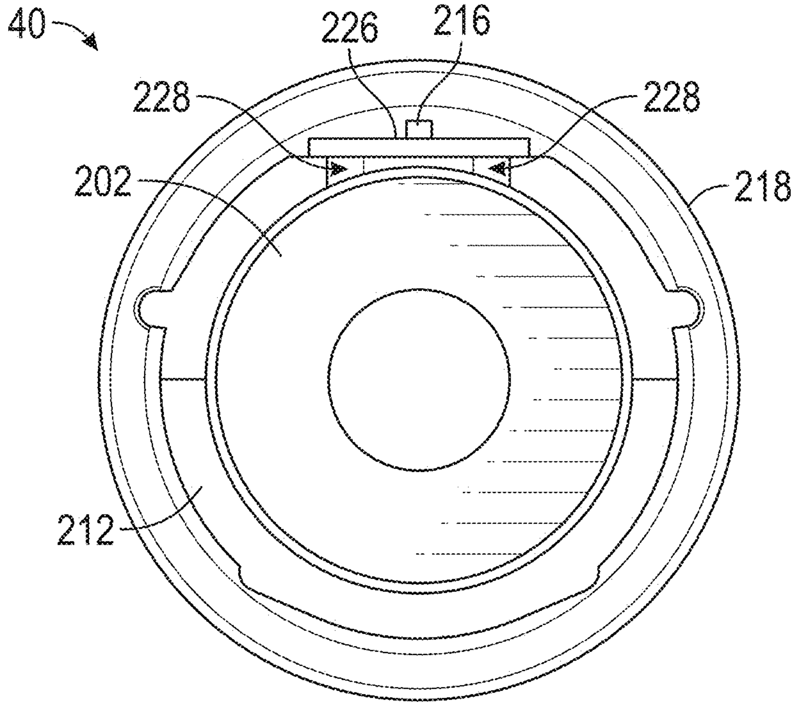
FIG. 13 is a schematic front view of inductive position sensor of FIG. 12 that further includes a cover surrounding the inductive position sensor, according to various implementations.
Figure 14:
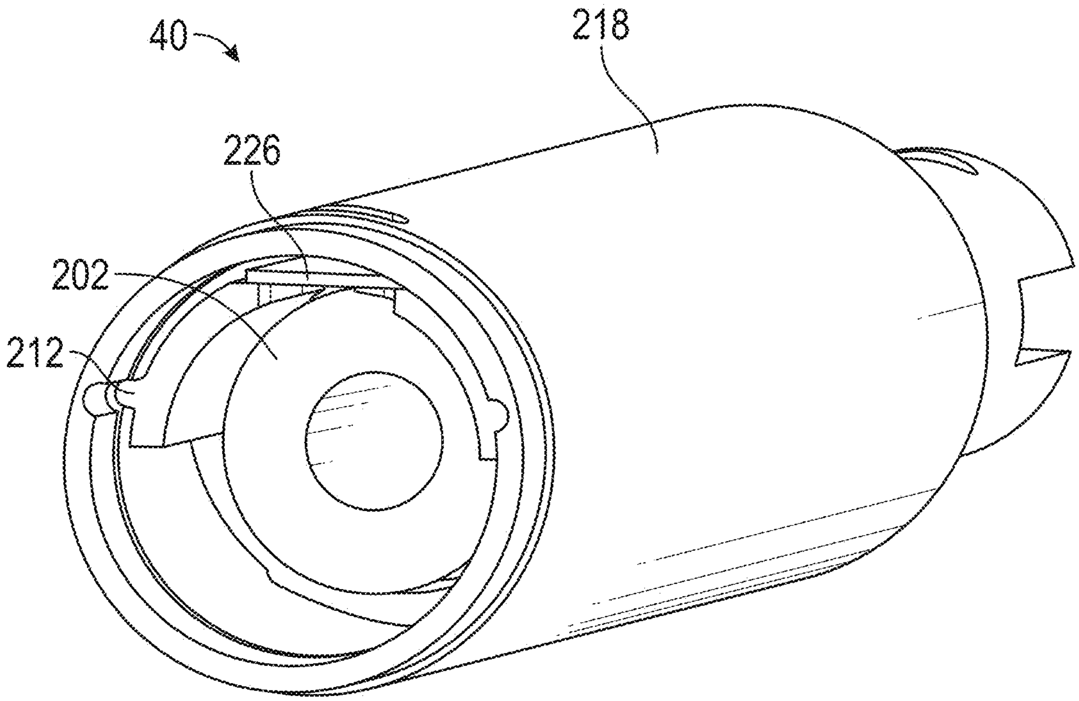
FIG. 14 illustrates a schematic perspective view of the inductive position sensor shown in FIG. 13.

FIGS. 12-14 are generally similar to the implementations of FIGS. 3-10 except that the implementations of FIGS. 12-14 can utilize a rigid substrate instead of a flexible substrate. Unless otherwise noted, the components in FIG. 12-14 may be the same as or generally similar to like-numbered components of FIGS. 3-10. Unlike the implementations of FIGS. 3-10, the inductive position sensor 200 can include a rigid substrate 226 instead of a flexible substrate (e.g., flexible substrate 108). For example, the rigid substrate 226 can be of a printed circuit board (PCB) type FR-4 as shown in FIG. 12.

FIG. 13 illustrates a side and/or front view of an assembly 40 of the rigid substrate 226 mounted to the non-conductive carrier 212 surrounding the target 202. FIG. 14 illustrates a perspective schematic view of the assembly 40 shown in FIG. 12. The rigid substrate 226 can be planar and tangent to a surface 203 of the target 202 resulting in the expansion of the heigh to the air gap 228 between the surface 203 and the rigid substrate 226 along the width of the rigid substrate 226. For example, the air gap 228 can change from 1.5 mm at opposite ends of the width of the rigid substrate 226 to 1 mm at the center of the rigid substrate 226.

Figure 15:
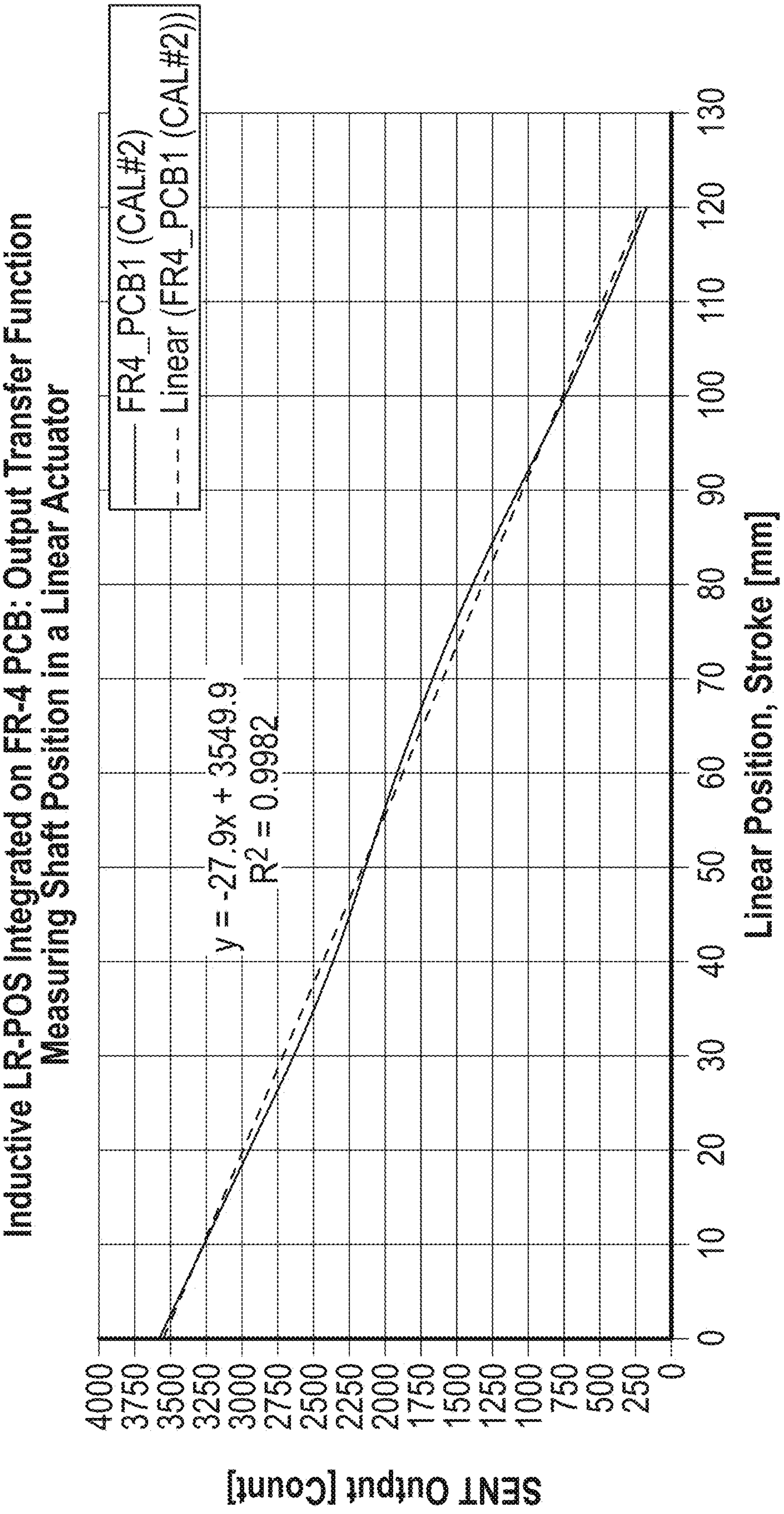
FIG. 15 is a graph demonstrating the linear transfer function of the inductive position sensor shown in FIG. 12, according to various implementations.

FIG. 15 is a graph demonstrating the linear transfer function of the inductive position sensor, similar to inductive position sensor 200, measuring the position of a target. The input is mechanical position change of the target in millimeters and the output is in a digital format [SENT; Single Edge Nibble Transmission] with a resolution of 12-bits. The test results show a linearity of the inductive position sensor measurements over the full-scale stroke of the actuator. Comparing an approximately uniform air gap to non-uniform air gap 228, the approximately uniform air gap can reduce the sensitivity of the inductive position sensor and impact the magnitudes of signals generated by the one or more inductive sensing coils by reshaping the one or more inductive sensing coils over the target to keep the approximately uniform air gap.

Examples Implementations of Rotary Inductive Position Sensors

Figure 16:
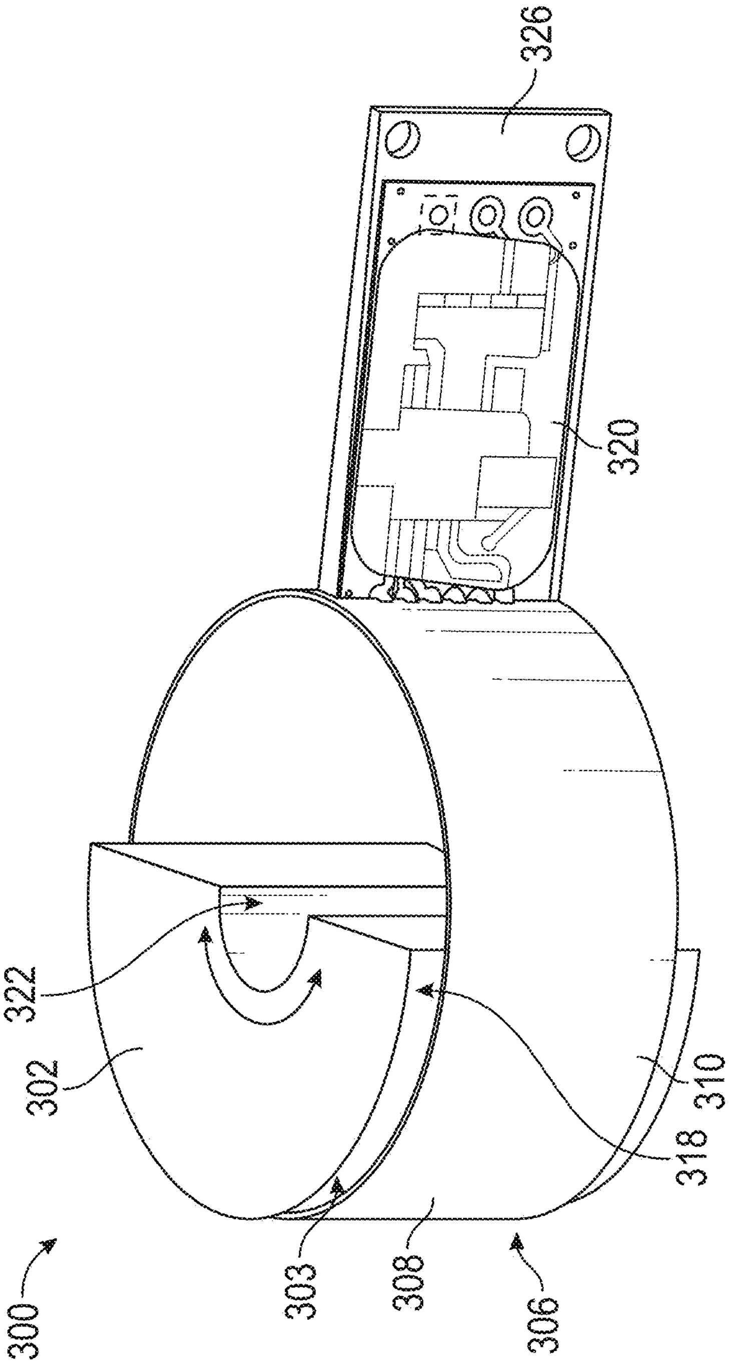
FIG. 16 is a schematic perspective view of another implementation of an inductive position sensor for rotary position sensing that includes a flexible substrate.

FIG. 16 illustrates another implementation of an inductive position sensor 300 that can be a rotary position sensor (RPS) for low-speed and high-speed motor-rotor sensing (MPS) applications. The inductive position sensor 300 can be used for linear angle measurement of a motor with ultra high-speed rotation. The inductive position sensor 300 can be used as a replacement of a high-cost resolver. A resolver is a type of electrical component used for measuring angular position that is commonly employed in control systems and motion control applications where precise angular information is required. A resolver is a type of rotary transformer having a primary winding and two secondary windings. The primary winding is excited with an alternating current (AC) signal, and the secondary windings are used to detect the angular position of the resolver's rotor. As the resolver rotor (the part that rotates) moves, it changes the coupling between the primary and secondary windings, resulting in variations in the output signals. By measuring the amplitudes and phases of these signals, the resolver can provide information about the rotor's angular position.

The inductive position sensor 300 can be used to continuously monitor, detect, track, measure, and/or report in real time the positions of an electrically conductive moving target 302 (CMT) connected to a mechanical part 304 (not shown), such as an actuator, to provide movement to the target 302. The inductive position sensor 300 can be used to measure at least one of proximity, angular, and rotary motional positions of the target 302. The inductive position sensor 300 can be identified as LR (Long-Range) as the inductive position sensor 300 is capable of measuring from short- to long-distance scanning of the target 302 over a sensing track 306 positioned around a center axis of rotation 322 of the target 302. The sensing track 306 can be an arched and/or curved. The target 302 can be integrated within a large radius rotary system in a rotary actuator system. The inductive position sensor 300 can be a non-contact smart position sensing device used in applications where long-range motion measurements are required. The inductive position sensor 300 can also operate as a non-contact low-to high-speed rotary/angular position sensor in a small to large radius angular measuring system.

As shown in FIG. 16, the sensing track 306 of the inductive position sensor 300 can include a flexible substrate 308 having one or more inductive sensing coils 310 disposed on or at least partially embedded in the flexible substrate 308. The flexible substrate 308 can begin as a flat substrate which is then shaped to conform to an edge surface profile 303 of the target 302. In some implementations, the flexible substrate 308 can partially and/or entirely encircle the target 302. Depending on the diameter of the target 302, the flexible substrate 308 diameter can be from tens to hundreds of millimeters. Shaping the flexible substrate 308 to the corresponding edge surface profile 303 can maintain at an approximately uniform air gap 318 between the edge surface profile 303 of the target 302 and the flexible substrate 308, the approximately uniform air gap 318 providing better performance and accuracy. Thus, by using a flexible material, the flexible substrate 308 can allow for the reshaping of the one or more inductive sensing coils 310 around a center axis of rotation 322 of the target 302. For example, the approximately uniform air gap 318 can be maintained at a distance between 0.1 mm to 10 mm, at a distance between 0.25 mm to 7.5 mm, at a distance between 0.5 mm to 5 mm, at a distance between 0.75 mm to 2.5 mm, at a distance between 0.9 mm to 1.25 mm, or at 1 mm around the target 302. Approximately uniform air gap 318 can also assist in maintaining stability in electromechanical characteristics and parameters required for proper operations, better performance, and higher accuracy of an inductive position sensor 300. The flexible substrate 308 can also allow the one or more inductive sensing coils 310 to be placed on an irregular curve-shaped track around the axis of rotation 322 rather than on a straight and/or circular shape. The flexible substrate 308 can be comprised of polymers and/or polyimide materials like polyimide film, Polyester, and/or polyethylene terephthalate (PET). The one or more inductive sensing coils 310 can be comprised of primary coils and secondary coils. In some implementations, the primary coils can be exciting and/or transmitting coils and the secondary coils can be pick up and/or receiving coils.

The inductive position sensor 300 can also include a one or more processors 320 in communication with the one or more inductive sensing coils 310 to process an output signal and determine a distance of the target 302 based at least in part on the processed output signal. The one or more processors 320 can also manage and process the one or more inductive sensing coils 310 by controlling and managing the inputs and outputs signals. The one or more processors 320 can be a smart signal management unit with the capability of controlling, programming, calibrations, computing and compensation algorithms, data storage, and/or reporting measurement data in analog and/or digital formats. The one or more processors 320 can be dispensed on or at least partially embedded in the flexible substrate 308 and/or another substrate separate from the flexible substrate 308. In some implementations, the processing performed by one or more processors 320 can be in a remote location separate from the inductive position sensor 300. Additionally or alternatively, the processing can occur in multiple locations which can provide redundancy and assist in accuracy.

One or more processors 320 can be electrically connected and/or wireless connected to the one or more inductive sensing coils 310 such that the one or more processors 320 is managing an input signal and the output signal to determine a position of the target 302. The one or more processors 320 can excite the primary coils to generate an Alternating Electromagnetic Fields (AEMF) which then couples onto secondary coils and produces alternating voltages as the output sensing signals. As the target 302 moves through and interrupts the generated AEMF field, the target 302 causes a disturbance and the voltage induced in the secondary coils alter as the target 302 changes position relative to one or more inductive sensing coils 110. In some implementations, the one or more processors 320 can also monitor an internal and/or external temperature sensor to dynamically measure the temperature changes affecting device functionalities of the inductive position sensor 300 for compensations. The one or more processors 320 can apply a temperature compensation algorithm in calculations to provide more accurate measurements to improve device performance.

The one or more inductive sensing coils 310 of the inductive position sensor 300 can be customized for measuring a short to long range of motions of the target 302. The sensing range and performance of the inductive position sensor 300 can depend on the designs and sizes of the one or more inductive sensing coils 310 and/or target 302, material of the target 302, and/or the precision of the one or more processors 320. The measurement accuracy and sensing performance can be directly related to one or more inductive sensing coils 310 and the target 302 electromechanical characteristics. The irregular shape of the surfaces or locations to mount one or more inductive sensing coils 310 and targets 302 can determine the relative motions between one or more inductive sensing coils 310 and the target 302 and consequently defines the performance of the sensing system and accuracy of the measuring position. Therefore, a flexible substrate, such as flexible substrate 308, to integrate the inductive sensing coils and/or processor becomes important in inductive position sensing, particularly in long-range position measuring systems.

The inductive position sensor 300 described above can be used for any number of paired poles. For example, the inductive position sensor 300 can be used for one paired-pole (1pp) rotary position sensing system. The one or more inductive sensing coils 310 and the target 302 of the inductive position sensor 300 can provide an output transfer function that one degree of mechanical angle change of the target 302 generates one degree of electrical angle change at output.

Figure 17:
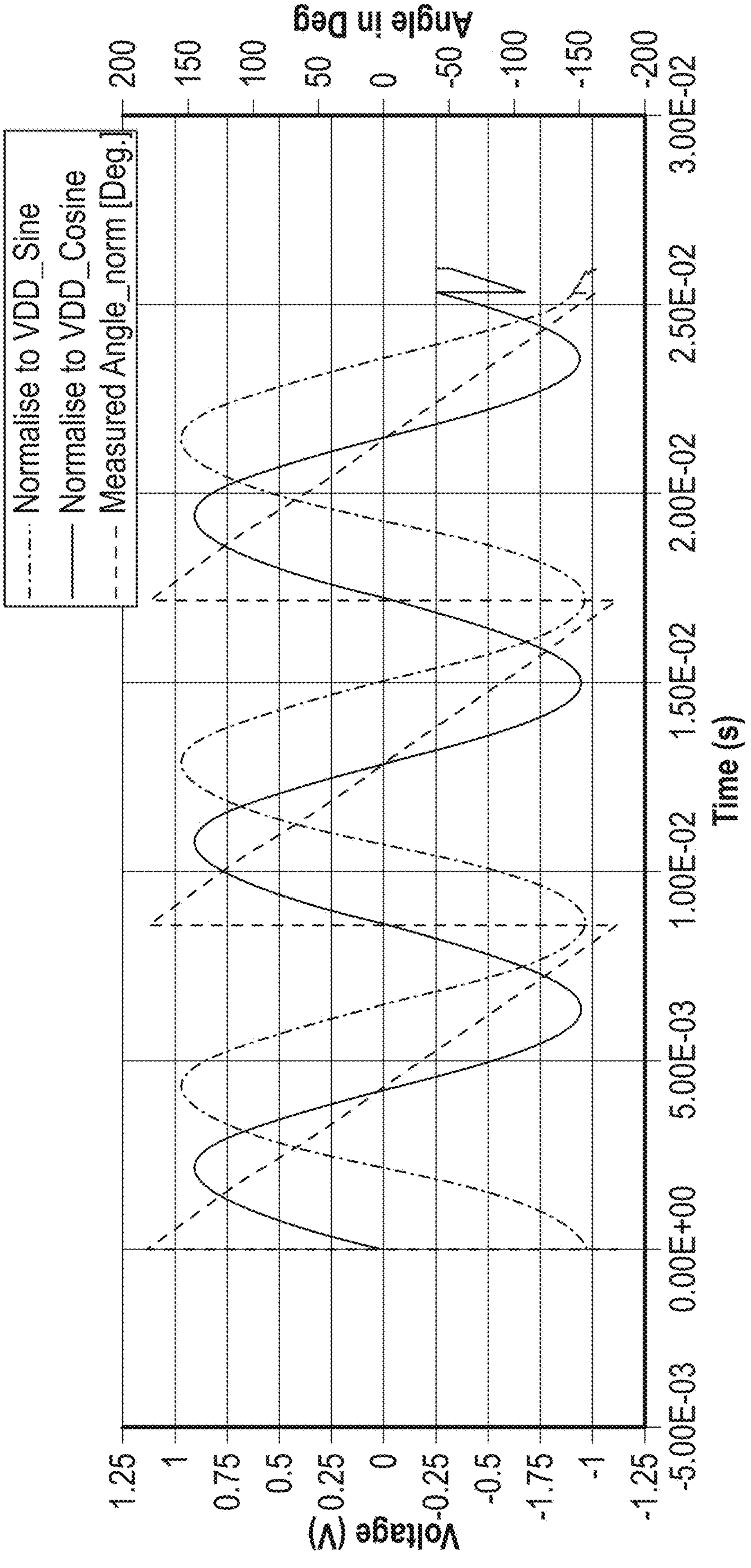
FIG. 17 is a graph that shows the output signals and linear transfer function of an exemplary inductive position sensor with one paired pole design for rotary application measuring.
Figure 18:
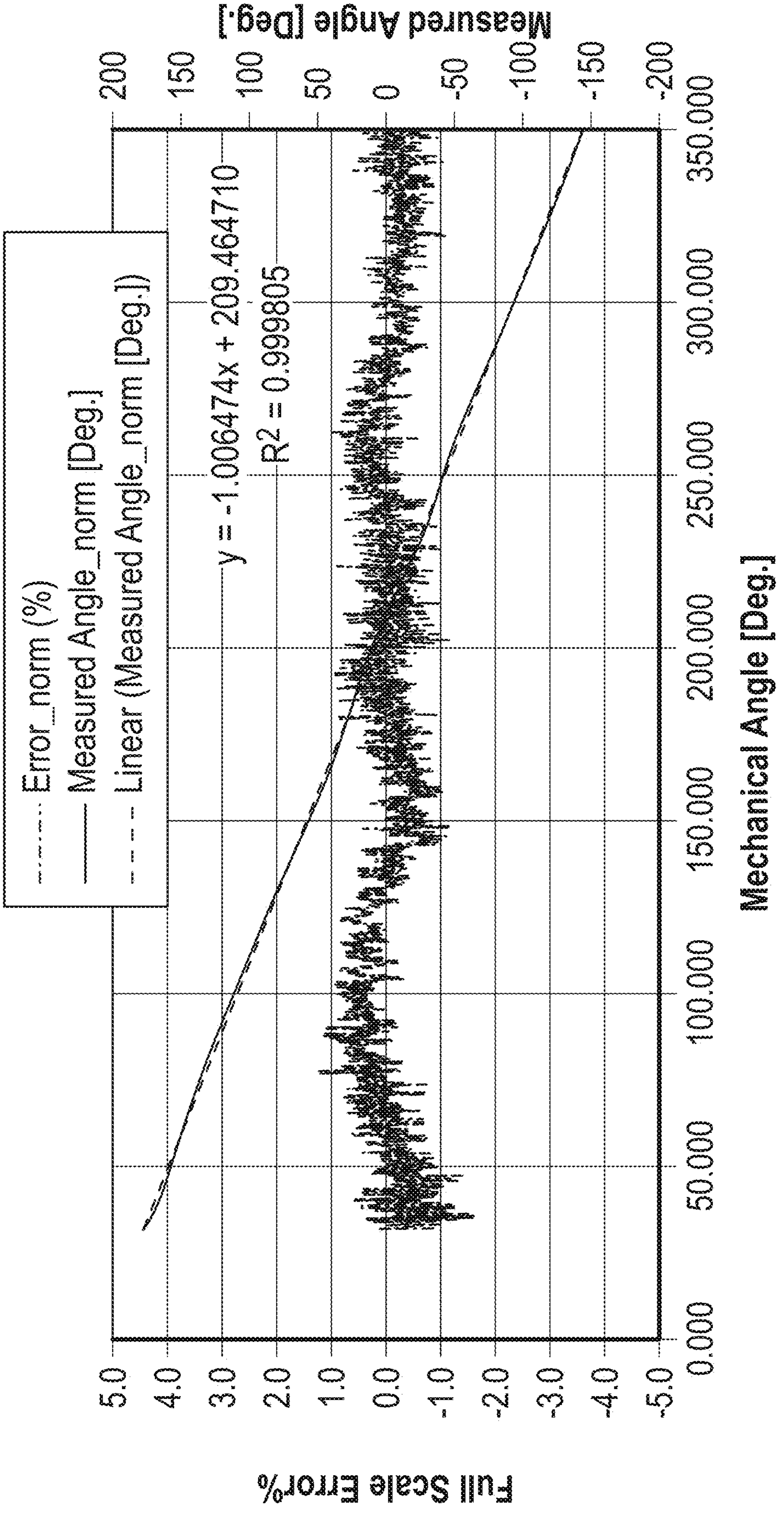
FIG. 18 is a graph that shows the output linear transfer function and total measuring error (% full-scale) of an exemplary inductive position sensor with one paired pole design used for rotary application measuring.

FIG. 17 illustrates a rotary transfer function of an exemplary inductive position sensor, similar to inductive position sensor 300, having the inductive sensing coils and the processor on the flexible substrate measuring the angular position of the target rotating around the axis of rotation. The input is mechanical angle position change of the target in degrees as displayed in FIG. 17, and the output is an analog signal in voltage (V). FIG. 18 illustrates the output linear transfer function and total measuring error (% full-scale) of inductive position sensor, similar to inductive position sensor 300, with one paired-pole (1pp) inductive sensing coils and target designs used in a rotary application (a motor) measuring the angular position of the target. This test ran at a speed of 7000 RPM. FIGS. 17-18 illustrate the output signals, angle measurements, and accuracy of the inductive position sensor for a rotary position sensing application having inductive sensing coils with one paired-pole (1pp) and target designs. Also, the results of FIGS. 17-18 demonstrate a measuring linearity over the full-scale stroke of 360 degrees of the target rotation, as well as accuracy and linearity.

Figure 19:
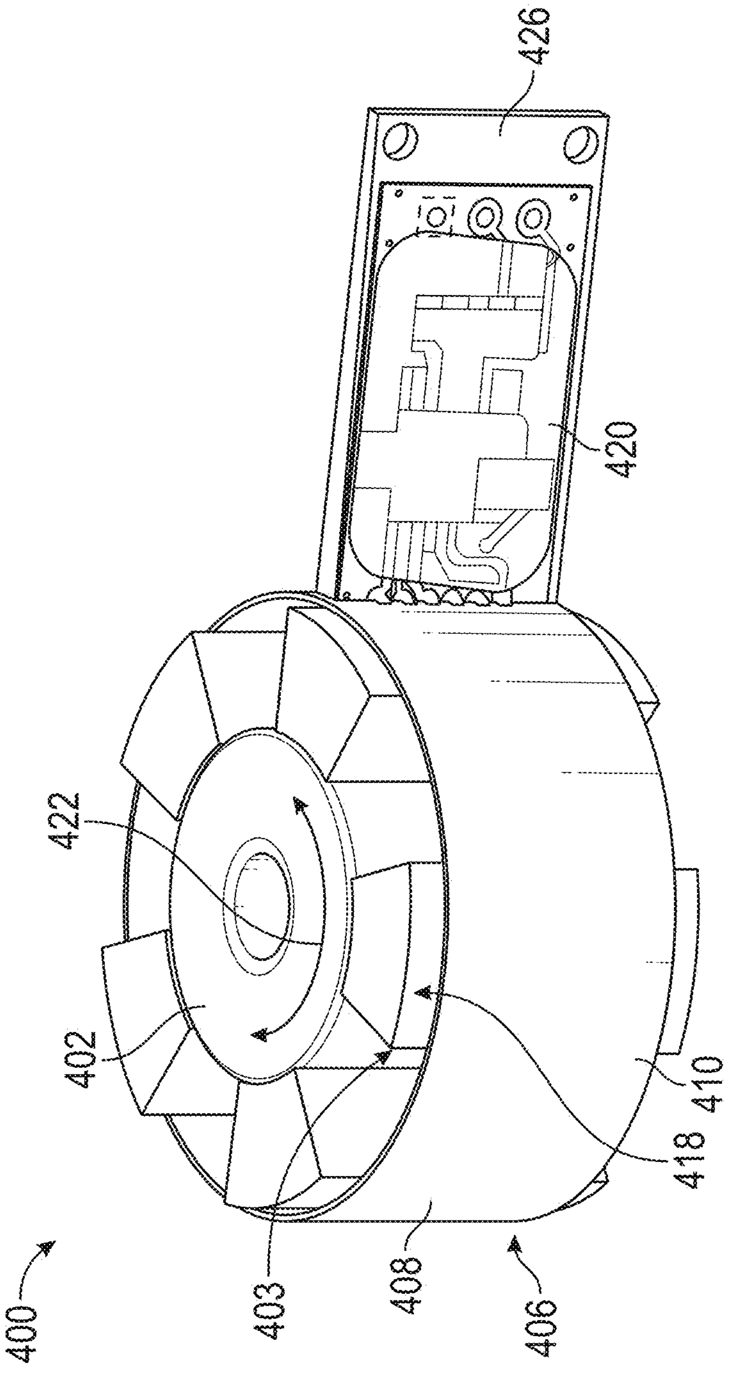
FIG. 19 is a schematic perspective view of another implementation of an inductive position sensor for rotary position sensing.

FIG. 19 is generally similar to the implementation of FIG. 16. Unless otherwise noted, the components in FIG. 19 may be the same as or generally similar to like-numbered components of FIG. 16. Unlike the implementations of FIG. 16, however, the inductive sensing coils 410 and the target 402 can be constructed for a five paired-pole (5pp) rotational angle position measuring system. Inductive position sensor 400 can also operate as a non-contact low to high speed rotary/angular position sensor in a small to large radius angular measuring system. The inductive sensing coils 410 can be positioned on a flexible substrate 408 and reshaped to conform to a surface profile 403 and an axis of rotation 422 of the target 402 with the orientation shown FIG. 19. Depending on target 402, the flexible substrate 408 diameter can be from tens to hundreds of millimeters. Similar to one or more processors 320, one or more processors 420 can be positioned on flexible substrate 408 and/or a separate substrate in communication to the inductive sensing coils 410.

As mentioned above, the inductive position sensor 400 can be built for a five paired-pole (5pp) rotary position sensing system. The inductive sensing coils 410 and the target 402 of inductive position sensor 400 can be designed to provide an output transfer function such that ⅕-degree of mechanical angle change of the target 402 generates one degree of electrical angle change at output. At a rotational speed of 1000 RPM, these five paired-pole (5pp) inductive sensing coil designs can generate sinusoidal signal outputs with the frequency of 83.33 Hz (5×1000/60).

Figure 20:
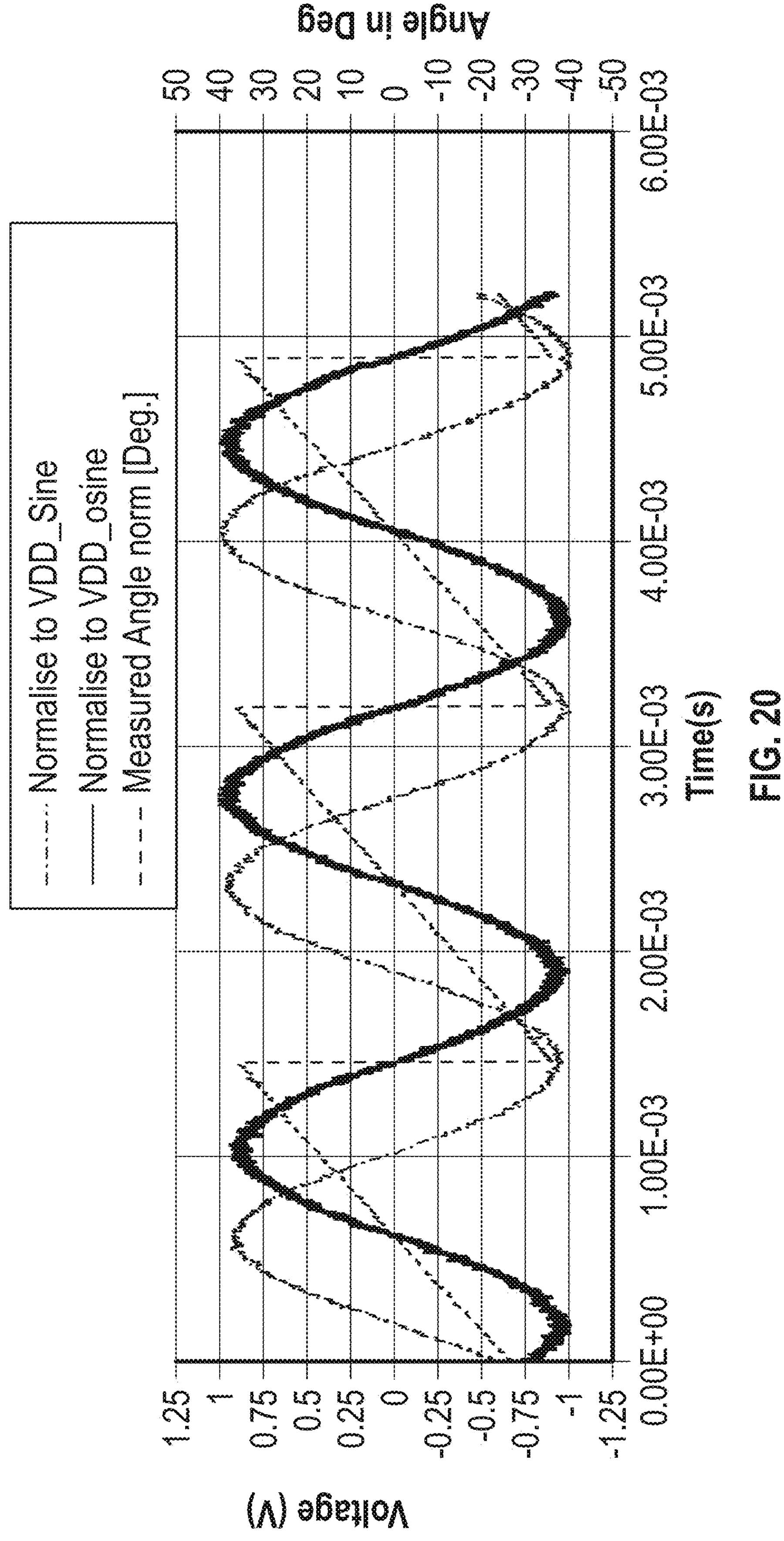
FIG. 20 is a graph that shows the output signals and linear transfer function of an exemplary inductive position sensor with five paired pole designs for rotary application measuring.
Figure 21:
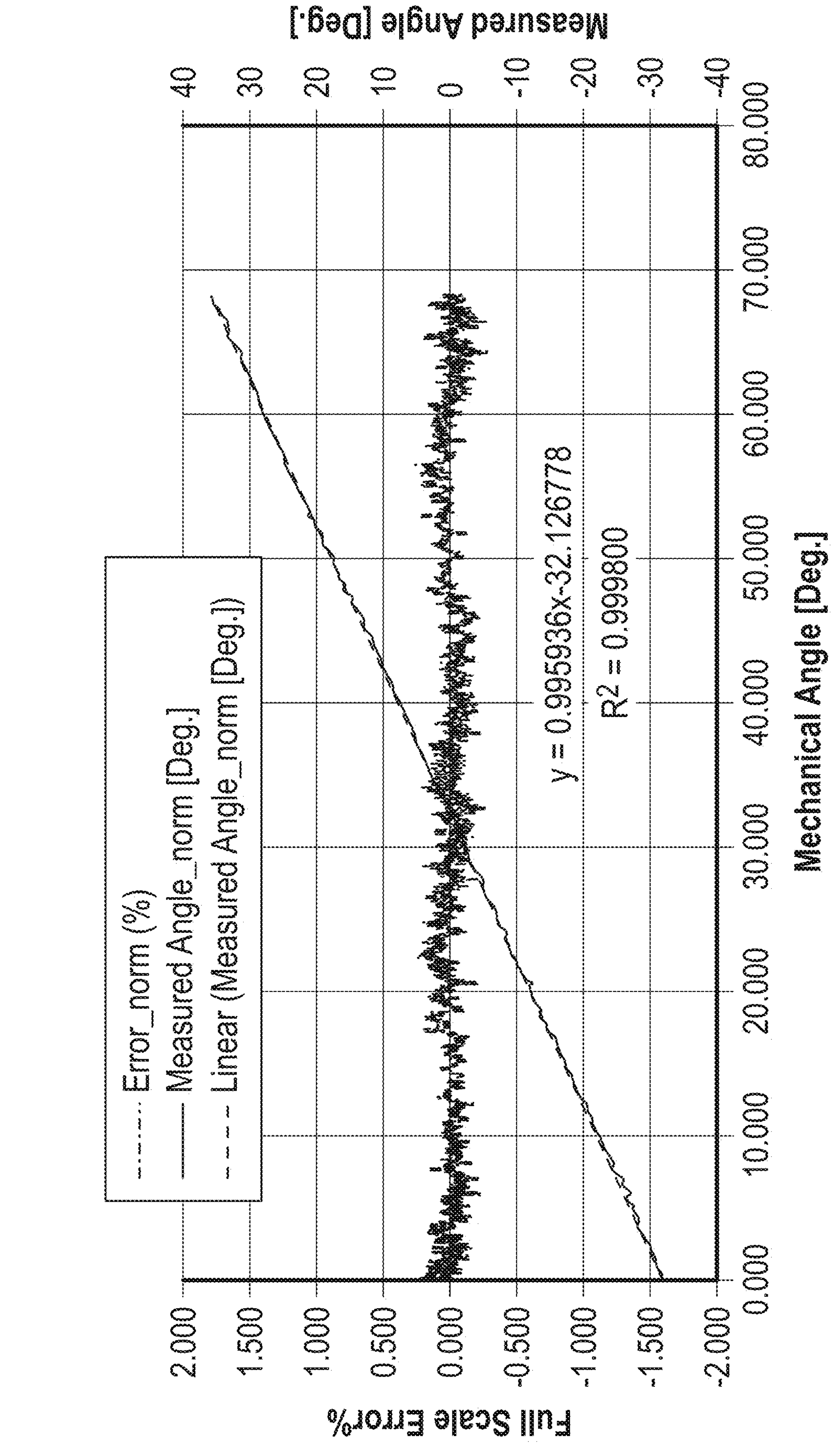
FIG. 21 is a graph that shows the output linear transfer function and total measuring error (% full-scale) of an exemplary inductive position sensor with five paired pole designs used for rotary application measuring.

FIG. 20 is a graph displaying the rotary transfer function of an inductive position sensor, similar to inductive position sensor 400, with the inductive sensing coil and the processor on flexible substrate measuring the angular position of the target rotating at the center. The input can be the mechanical angle position change of the shaft in degrees as displayed in FIG. 20, and the output is an analog signal in voltage (V). FIGS. 20-21 are graphs demonstrating the output signals, angle measurements, and accuracy of an inductive position sensor, similar to inductive position sensor 400, for a rotary position sensing application with five paired-pole (5pp) inductive sensing coils and target designs. Also, the results of FIGS. 20-21 demonstrate a measuring linearity over the full-scale stroke of 360 degrees of the target rotation, as well as accuracy and linearity. By comparing the test results shown in FIGS. 17-18 with FIGS. 20-21, the five paired-pole (5pp) design of an inductive position sensor compared with the one paired-pole (1pp) design results in better device performance and higher accuracy.

Figure 22:
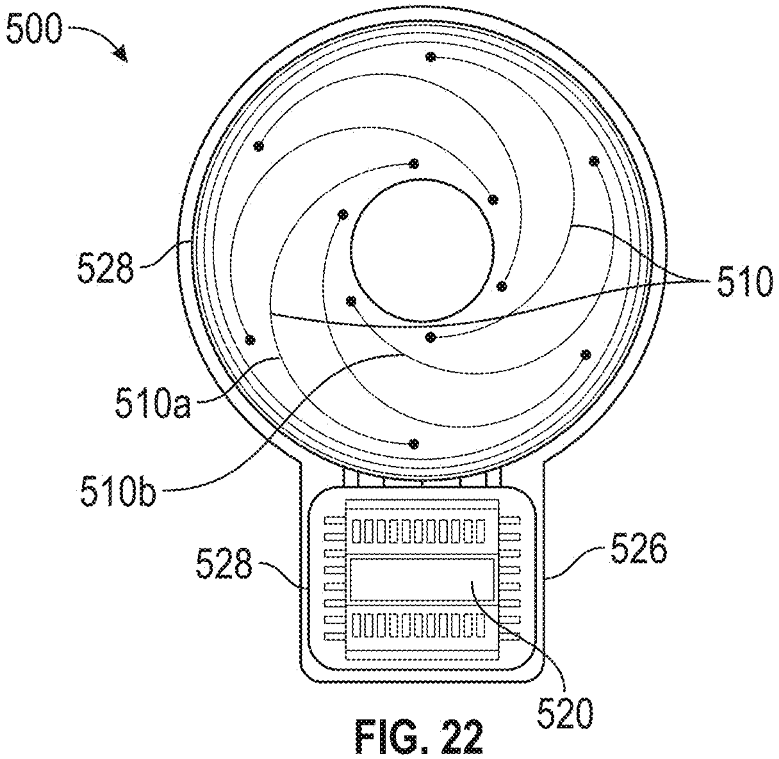
FIGS. 22-23 are a top view of another implementation of an inductive position sensor that includes a rigid substrate.
Figure 23:
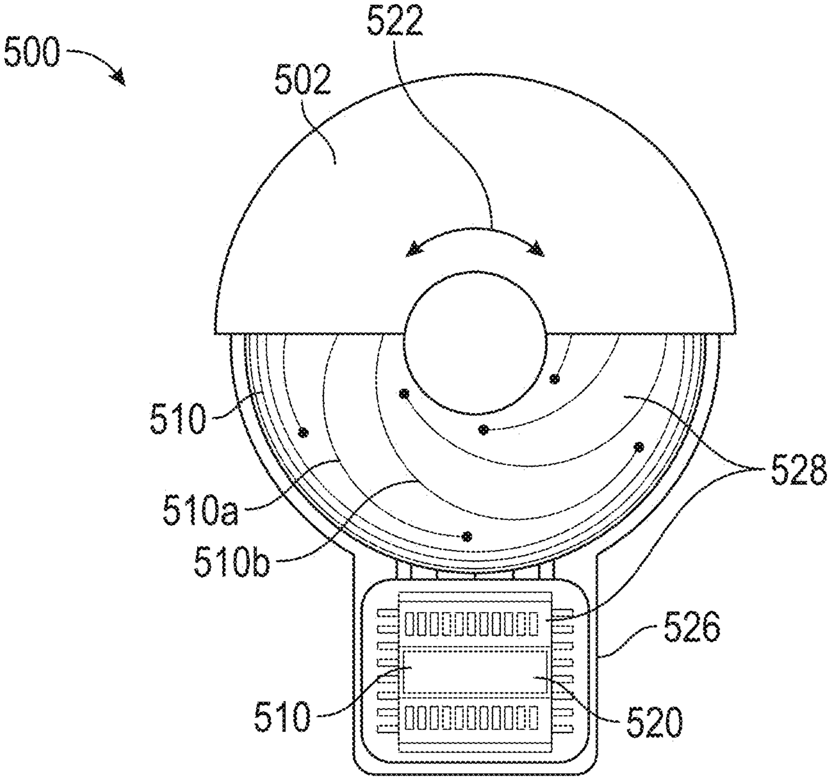

FIGS. 22-23 are generally similar to the implementations of FIGS. 16 and 19. Unless otherwise noted, the components in FIGS. 22-23 may be the same as or generally similar to like-numbered components of FIGS. 16 and 19. Unlike the implementations of FIGS. 16 and 19, however, the inductive position sensor 500 can include a rigid substrate 528 instead of a flexible substrate (e.g., flexible substrate 408). For example, the rigid substrate 528 can comprise a printed circuit board (PCB) type FR-4. The rigid substrate 528 can surround an axis of rotation 522 of the target 502.

At least one of or both of the one or more inductive sensing coils 510 (e.g., primary coils 510*a* and secondary coils 510*b*) and the one or more processors 520 can be positioned on the rigid substrate 528. In some implementations, the inductive sensing coils 510 can be located on one end of the rigid substrate 528 and the one or more processors 520 can be positioned on another end from the inductive sensing coils 510. In some implementations, the one or more processors 520 positioned on a rectangular section 530 of the rigid substrate 528.

The inductive position sensor 400 shown in FIGS. 22-23 can be designed for one paired-pole (1pp) rotary position sensing system, but other implementations can be also designed for multi-poles. The inductive sensing coils 510 and target 502 of the inductive position sensor 500 can provide an output transfer function that one degree of mechanical angular rotation change of the target 502 position generates one degree of electrical angle change at output.

For multi-pole design with N numbers of paired poles, 1/N degree change of mechanical rotation of the target 502 generates one degree of electrical angle change at output which can lead to a higher resolution of rotational angle measurement. For multi-pole design, the frequency of the sinusoidal signal outputs (usually sine and cosine shaped signals) of the inductive sensing coils 510 are equal to the speed of rotation (RPM) times the number of paired poles and divided by sixty. At rotational speed of 1000 RPM, a six paired-pole (6pp) inductive sensing coils design generates a sinusoidal signal outputs with the frequency of 100 Hz (6×1000/60).

Figure 24:
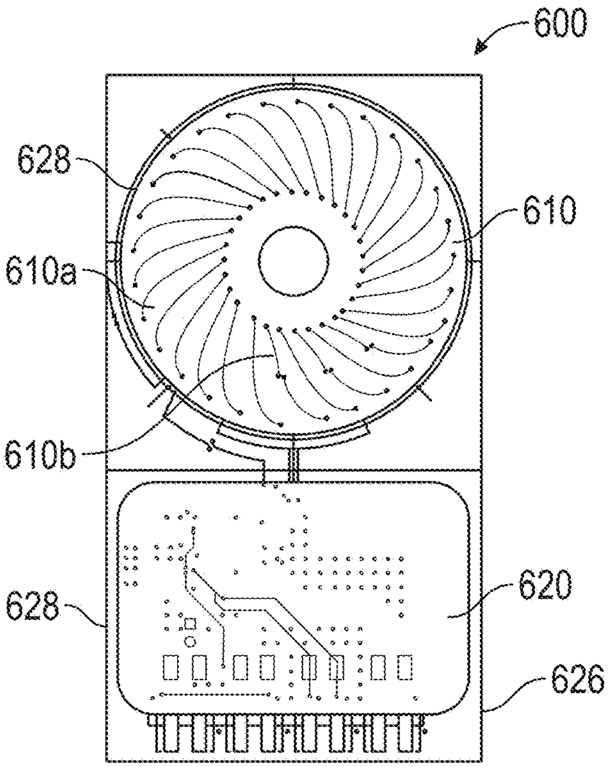
FIGS. 24-25 are a top view of another implementation of an inductive position sensor that includes a rigid substrate.
Figure 25:
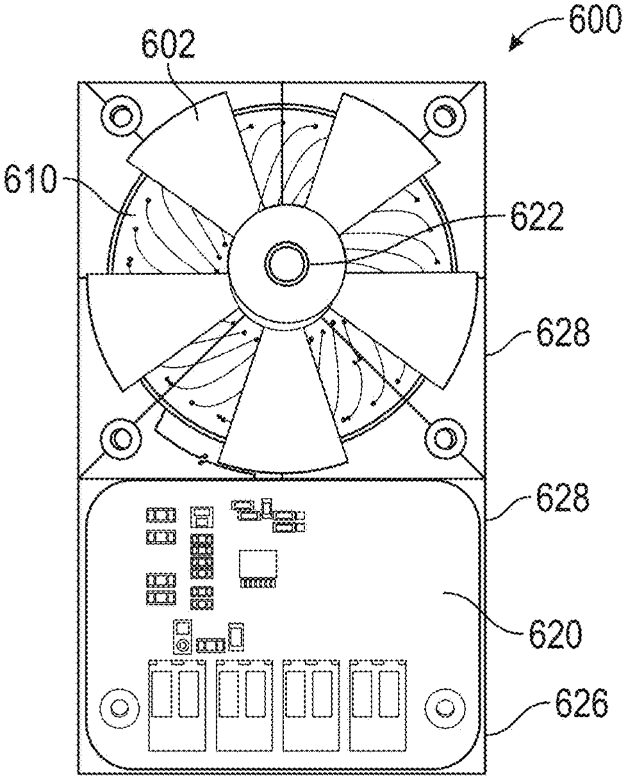
Figure 26:
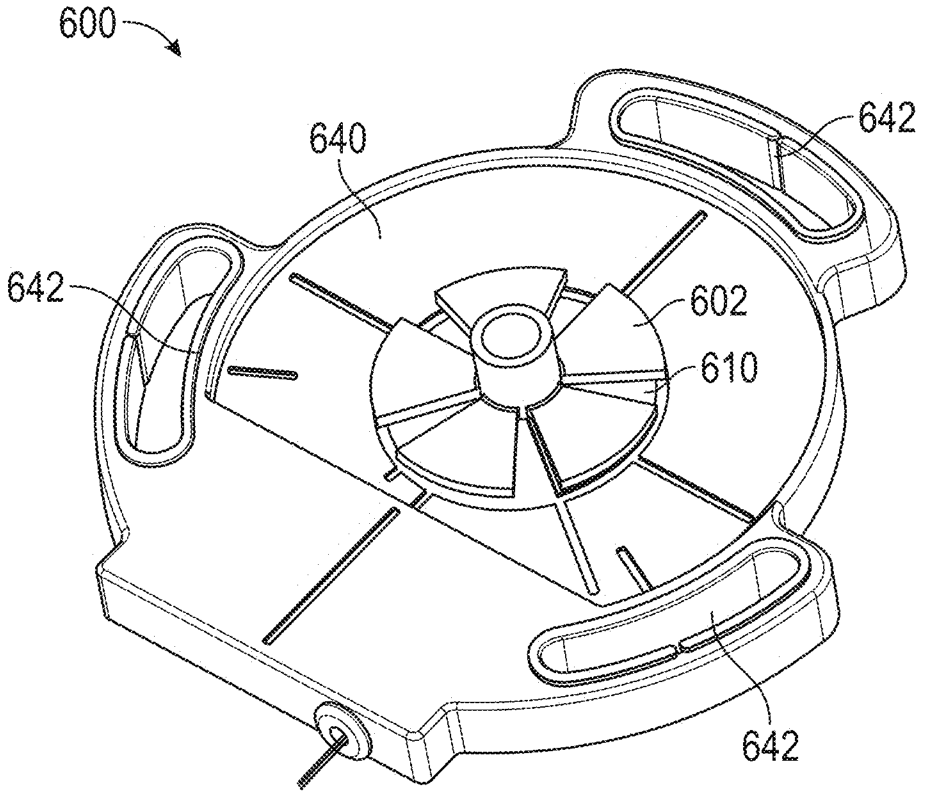
FIG. 26 is a schematic perspective view of a housing for an inductive position sensor with adjustable mounting features, according to some implementations.
Figure 27:
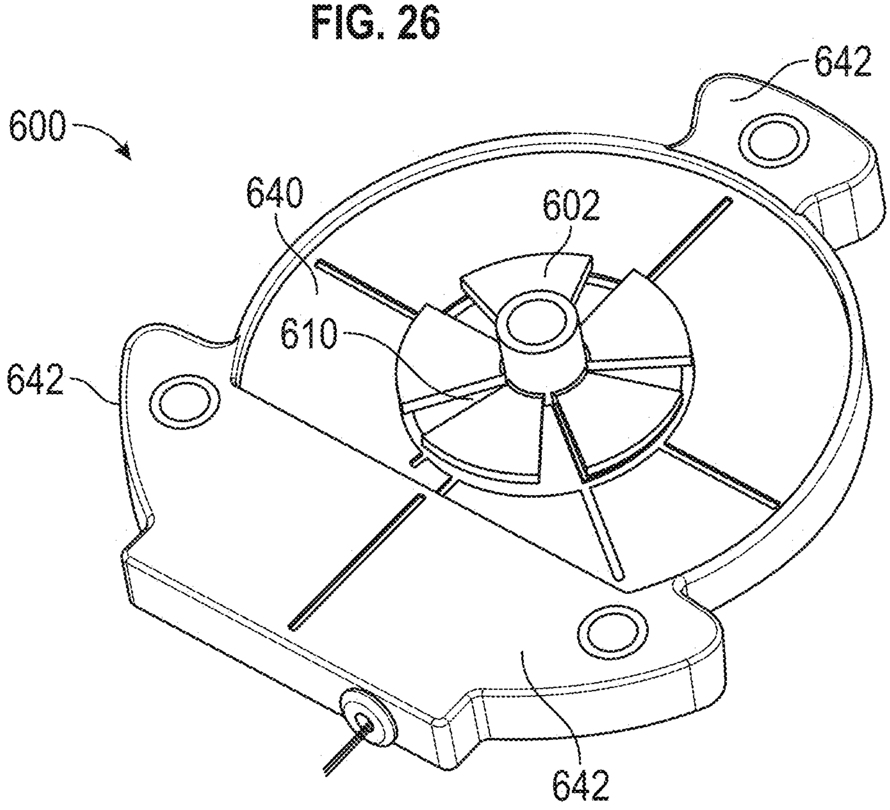
FIG. 27 is a schematic perspective view of another implementation of a housing for an inductive position sensor with non-adjustable mounting features, according to some implementations.

FIGS. 24-25 are generally similar to the implementations of FIGS. 22-23. Unless otherwise noted, the components in FIGS. 24-25 may be the same as or generally similar to like-numbered components of FIGS. 22-23. Unlike the implementations of FIGS. 22-23, however, inductive sensing coils 610 (e.g., primary coils 610*a* and secondary coils 610*b*) and one or more processors 620 of an inductive positioning sensor 600 can be designed and/or fabricated for five paired-pole (5pp) rotational angle position measurements. The inductive positioning sensor 600 can operate as a non-contact low to high speed rotary/angular position sensor in a small to large radius angular measuring system. The inductive sensing coils 610 can be positioned on one end of a rigid substrate 628 that surrounds an axis of rotation 622 of the target 602 and the one or more processors 620 can be positioned on another end of the rigid substrate 628. Additionally, FIGS. 26-27 illustrate a housing 640 with mounting feature 642 (e.g., holes, slots, etc.) for packaging the inductive positioning sensor 600. FIG. 26 illustrates an adjustable housing 640 with mounting feature 642. The mounting feature 642 can be sized and shaped to allow for mechanical alignment of the inductive sensing coils 610 under the target 602. In some implementations, the target 602 can be connected to a motor rotor shaft at zero mechanical-angle reference for the inductive positioning sensor 600 zero-output. In FIG. 27, the housing 640 can be non-adjustable such that the mounting feature 642 prohibit mechanical alignment of the inductive sensing coils 610.

For inductive positioning sensor 600, ⅕-degree change of mechanical rotation of the target 602 can generate one degree of electrical angle change at output. The frequency of the sinusoidal signal outputs of the inductive sensing coils 610 can be equal to the speed of rotation (RPM) times five (number of paired poles) and divided by sixty. At rotational speed of 1000 RPM, these five paired-pole (5pp) inductive sensing coil designs generate sinusoidal signal outputs with the frequency of 83.33 Hz (5×1000/60).

Figure 28:
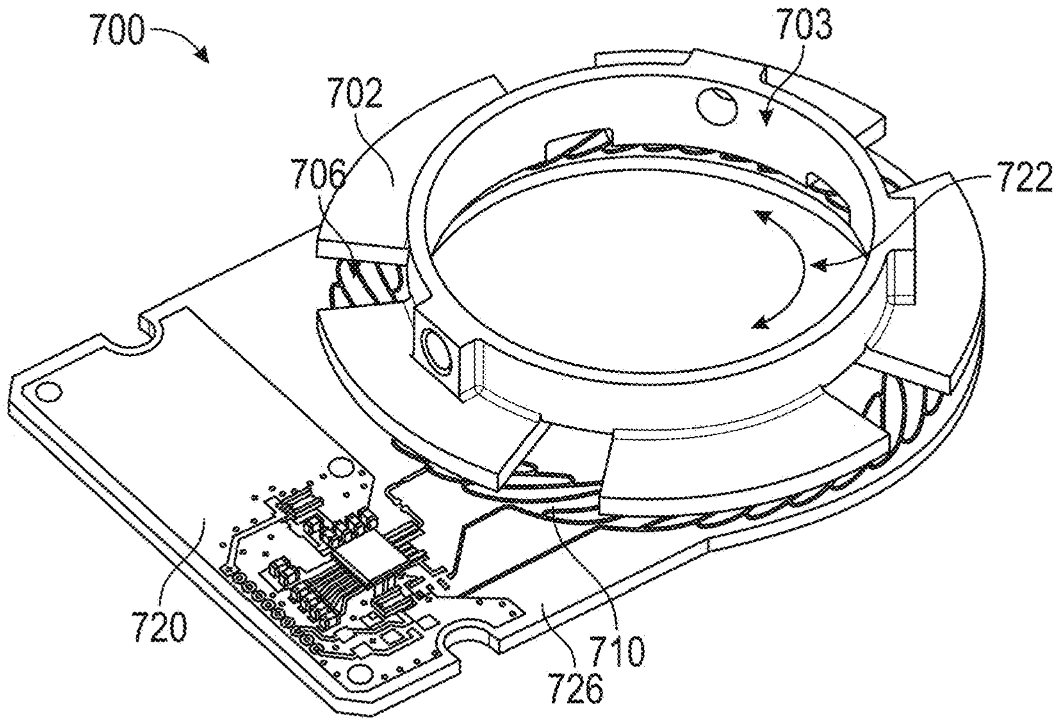
FIG. 28 is a schematic perspective view of an inductive position sensor having a full circular rigid substrate, according to some implementations.
Figure 29:
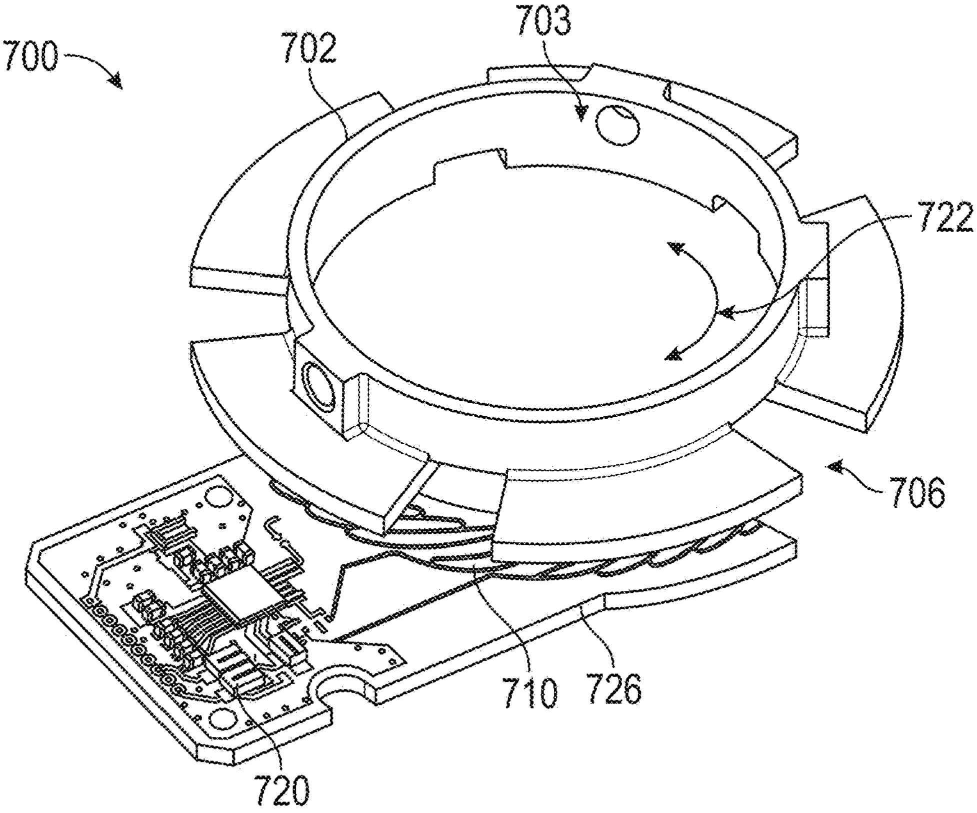
FIG. 29 is a schematic perspective view of another inductive position sensor having an arc-shaped rigid substrate, according to some implementations.

FIGS. 28 and 29 illustrate another implementation of an inductive positioning sensor 700. The inductive positioning sensor 700 can also be known as an inductive motor position sensor (iMPS). The inductive positioning sensor 700 of FIGS. 28 and 29, unless otherwise noted, may be the same as or generally similar to like-numbered components of FIGS. 22-25. The inductive positioning sensor 700 can measure the angular position of a rotating shaft connected the target 702. The inductive positioning sensor 700 can also be considered an electronic version and replacement of a traditional resolver.

Referring to FIG. 28, the inductive positioning sensor 700 can include a circular inductive sensing coil 710 with a large radius. The circular inductive sensing coil 710 can comprise an annular shape. The circular inductive sensing coil 710 can allow a motor shaft and/or rotor pass through (thru-shaft) the inductive positioning sensor 700. The inductive positioning sensor 700 of FIG. 29 can include a smaller arc-shaped inductive sensing coils 710. By having an arc-shaped full circular inductive sensing coil 710, the inductive positioning sensor 700 can be mounted on a side of a motor shaft (side-shaft) application. The arc-shaped (side-shaft) configuration of the inductive positioning sensor 700 can reduce the cost of the PCB for large radius motor-rotor application and allow for simpler mounting and integration of the inductive positioning sensor 700 in motor applications. The inductive positioning sensor 700 of FIGS. 28 and 29 can operate as non-contact low- to high-speed rotary and/or motor position sensor in a small to large radius angular measuring system. One or more processors 720 can be integrated on a dedicated portion of a rigid substrate 726 attached to the full circular inductive sensing coil 710. In some implications, the dedicated portion of a substrate can be approximately 15 millimeters by 15 millimeters.

Figure 30:
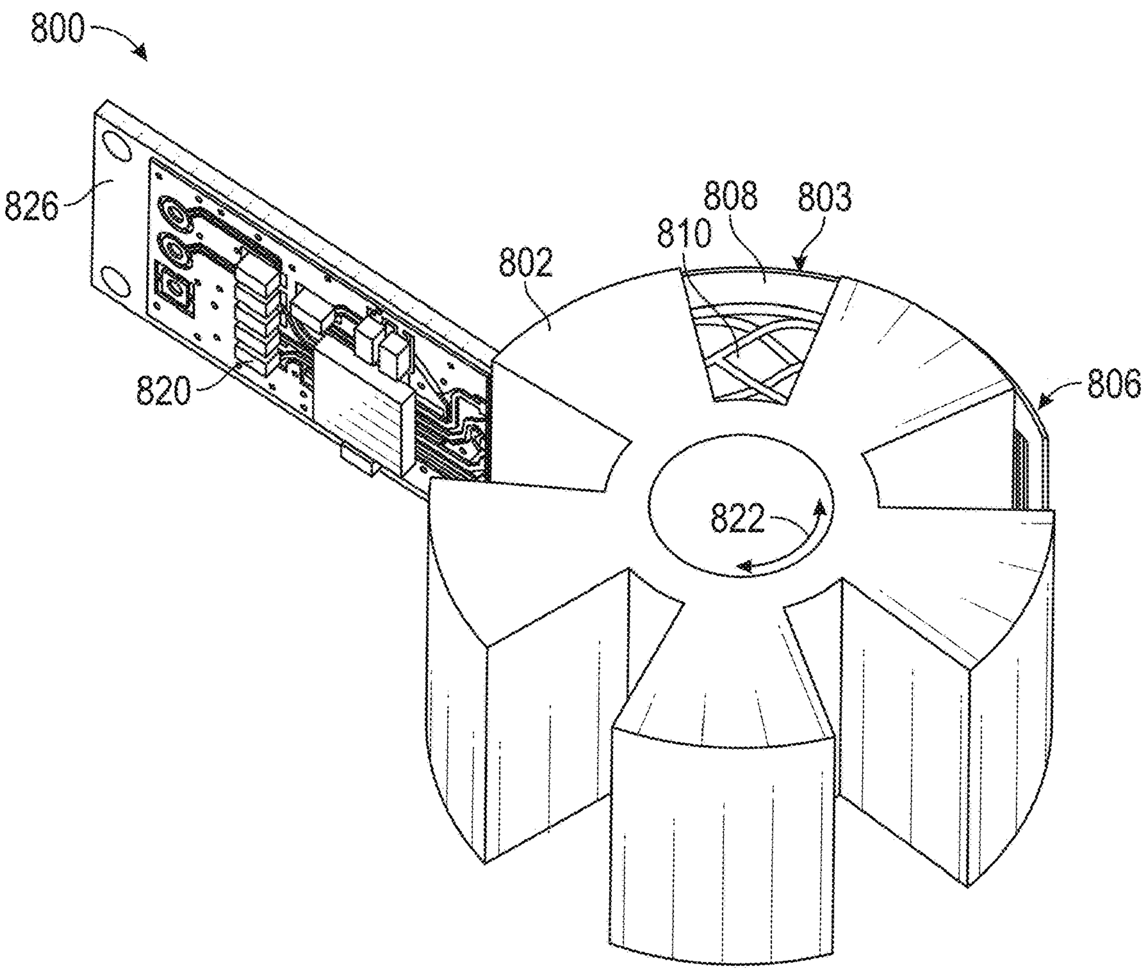
FIG. 30 is a schematic perspective view of a five paired-pole inductive rotary and/or motor position sensor that includes both a rigid substrate and an arc-shaped flexible substrate, according to various implementations.
Figure 31:
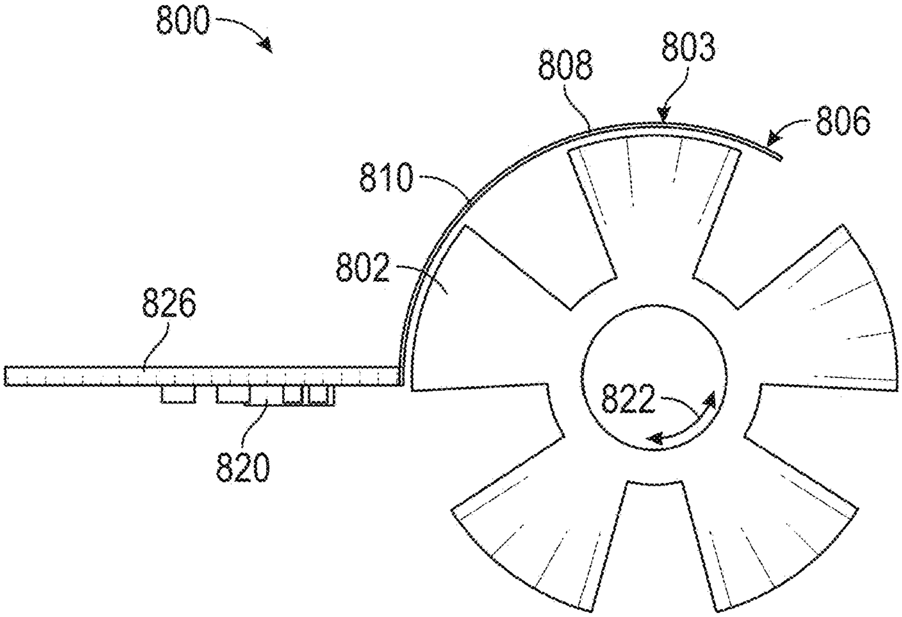
FIG. 31 is a schematic top view of the five paired-pole inductive rotary and/or motor position sensor of FIG. 30, according to various implementations.

FIGS. 30 and 31 illustrate another implementation of an inductive positioning sensor 800. The inductive positioning sensor 800 can also be known as an inductive rotary and/or motor position sensor (iRPS/iMPS). The inductive positioning sensor 800 of FIGS. 30 and 31, unless otherwise noted, may be the same as or generally similar to like-numbered components of FIGS. 22-29. The inductive positioning sensor 800 can include an inductive sensing coil 810 disposed on an arc-shaped flexible substrate 808 and one or more processors 820 can be disposed on an adjoining solid substrate 826.

The inductive sensing coil 810 and the rotary target 802 can measure the mechanical angle of the motor rotor between 0 to 360° degrees. Similar to the inductive position sensor 400 shown in FIG. 19, the inductive sensing coil 810 can also be fabricated on a flexible substrate and reshaped to an arc-shaped with the orientation shown in FIGS. 30 and 31. Depending on the shaft and rotary target 802 diameters, the length of arc-shaped flexible substrate 808 can be from tens to hundreds of millimeters. In some implementations, one or more processors 820 can be integrated on an area (e.g., 15 mm×15 mm) of a flexible or a rigid substrate and connected to the inductive sensing coil 810 on the arc-shaped flexible substrate 808. Similar to the inductive positioning sensor 700 in FIG. 19, the inductive positioning sensor 800 shown in FIGS. 30 and 31 can be built for five paired-pole (5pp) rotary/motor position sensing system (iRPS/iMPS). The inductive positioning sensor 800 can be designed to measure the rotary position of the motor rotor/shaft in full range of 0 to 360° degrees for an iMPS application. For this 5pp arc-shaped inductive positioning sensor 800 built on a flex-substrate, one degree of mechanical angle change of the shaft (rotary target 802) generates 5 degree of electrical angle change at output.

Figure 32:
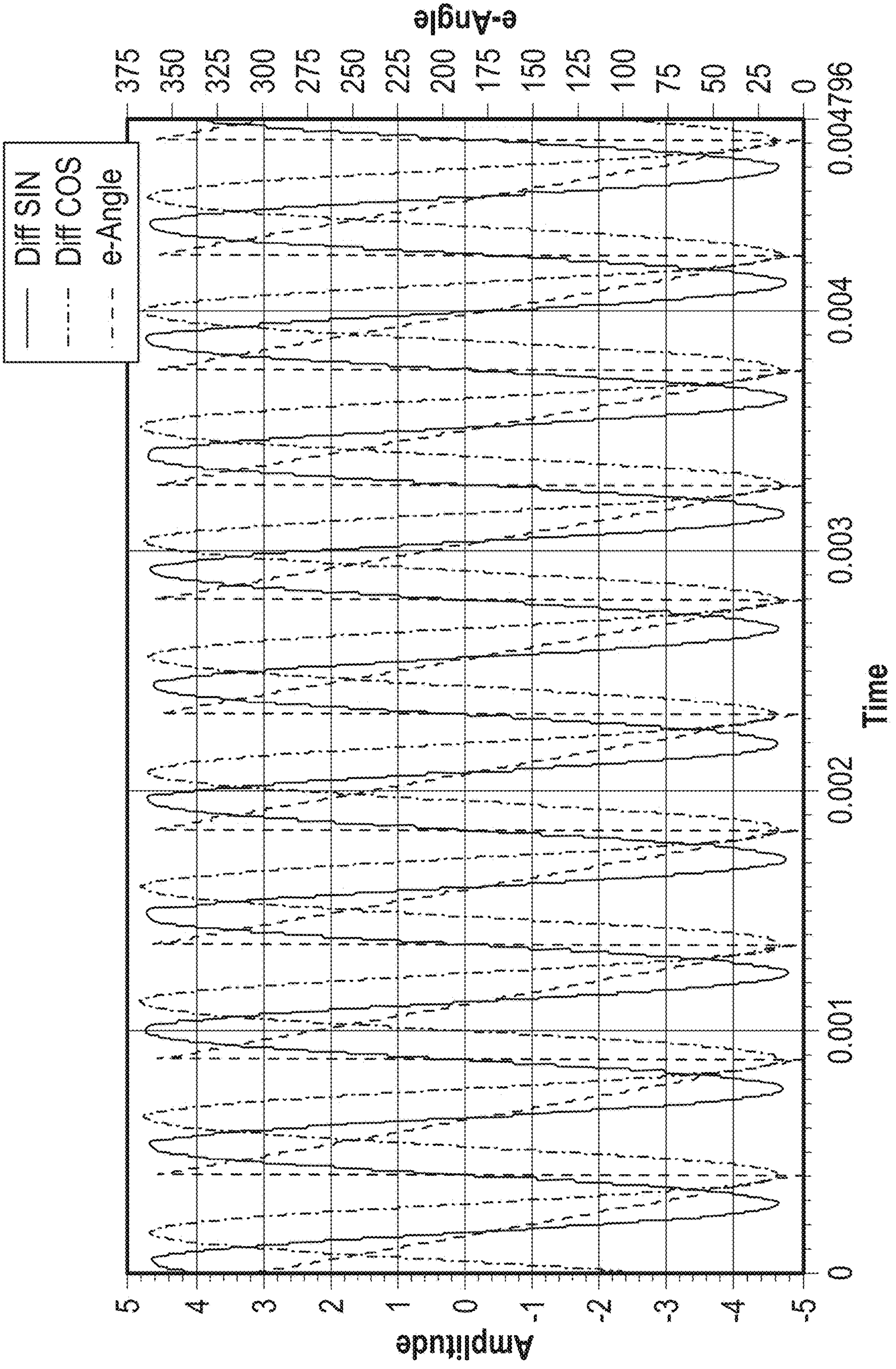
FIG. 32 is a graph demonstrating the output signals and linear transfer function of the inductive position sensors shown in FIGS. 19 and 30-31 having five paired-pole designs ran at 25 k RPM.

FIG. 32 is a graph that shows a linear transfer function of the inductive position sensor of FIGS. 19 and 30-31. The transfer function, the output signal, and the accuracy of the 5pp arc-shaped inductive positioning sensor 700 and inductive positioning sensor 800 shown in FIGS. 28-31 are similar to what is presented in FIGS. 19 and 20. The input is mechanical angle position change of the shaft in degrees [deg.], and the output is an analog signal in voltage [V]. The calculated accuracy of an iRPS/iMPS built on a flex-substrate is high, wherein the measuring angle error is typically well-below 0.1% of the full-scale measurements without considering mechanical noises on the motor rotor/target 702, 802 after calibration by the one or more processors 720, 820. FIG. 32 illustrates the output signals and the transfer function of the one or more processors 720, 820 of a 5pp iRPS/iMPS for the motor angular position sensing application ran at 25 k RPM.

The 5pp inductive positioning sensors 700, 800 of the implementations illustrated in FIGS. 19 and 30-31 can be configured for similar functionality in rotary/motor position sensing applications. However, depending on the radius of the rotary application, the costs associated with fabrication of the inductive sensing coils on the flexible substrates can lead to the arc-shaped inductive positioning sensor 800 being more cost effective in part due to its shorter length of the inductive sensing coil 810. The full circle-shaped inductive sensing coils 410 can make the inductive position sensor 400 more expensive. The inductive sensing coils of an inductive positioning sensor built on a full circle-shaped flexible substrate can result in an improvement in accuracy when compared to those inductive positioning sensors built on an arc-shaped flexible substrate in part due to electromagnetic field principles.

Figure 33:
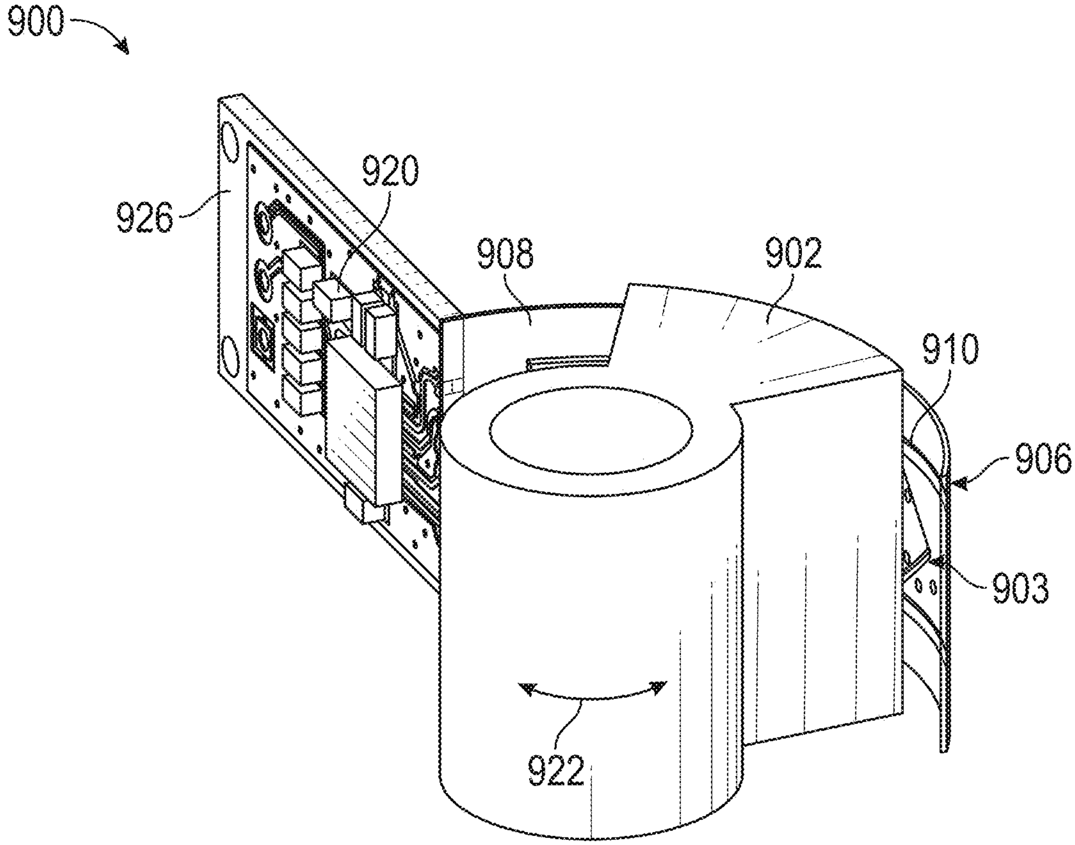
FIG. 33 is a schematic perspective view of a one paired-pole inductive rotary and/or motor position sensor that includes both a rigid substrate and an arc-shaped flexible substrate, according to various implementations.
Figure 34:
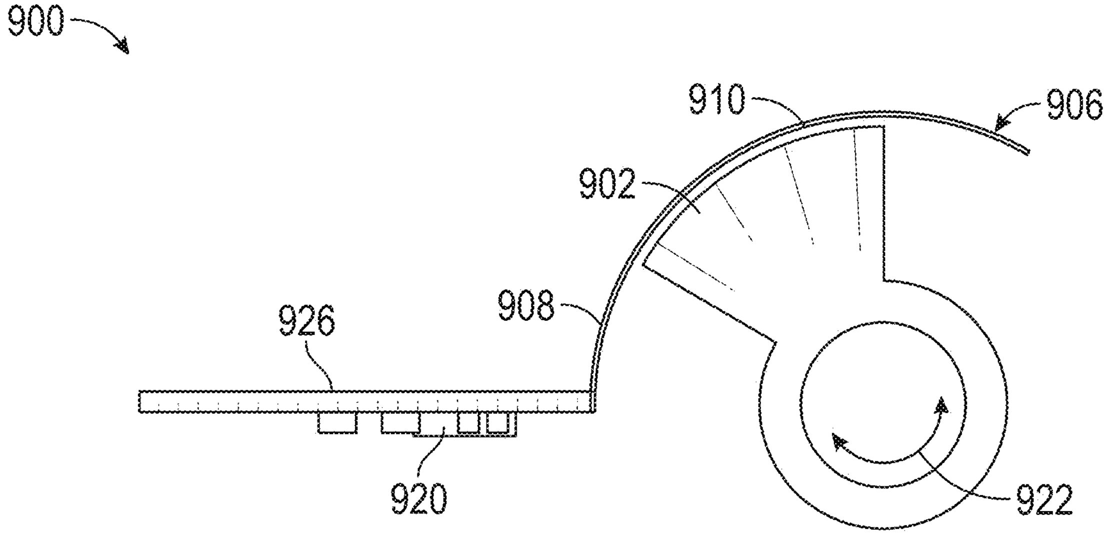
FIG. 34 is a schematic top view of the one paired-pole inductive rotary and/or motor position sensor of FIG. 33, according to various implementations.

FIGS. 33-34 illustrate another implementation of an inductive positioning sensor 900. The inductive positioning sensor 900 can be configured for inductive angular position sensing (iAPS) applications. The inductive positioning sensor 900 of FIGS. 33 and 34, unless otherwise noted, may be the same as or generally similar to like-numbered components of FIGS. 22-31. The inductive positioning sensor 900 can include an inductive sensing coil 910 disposed on an arc-shaped flexible substrate 908 and one or more processors 920 can be disposed on an adjoining solid substrate 926. The inductive sensing coil 910 and the rotary target 802 can perform angle measurements between 0 to 360° degrees. The inductive positioning sensor 900 can be similar to the inductive positioning sensor 700 illustrated in FIG. 29, but the inductive sensing coil 910 can be disposed on flexible substrate 908 rather than the rigid substrate 726 configured for a reduced range of angular position measurements. The configuration of the inductive sensing coil 910 and arc-shaped flexible substrate 908 can allow use of the inductive positioning sensor 900 in wider iAPS applications.

The inductive positioning sensor 900 can operate as a non-contact angular position sensor in a small to large radius angular measuring system as those shown in FIGS. 2A-2B. The inductive sensing coils 910 built on the arc-shaped flexible substrate 908 can be fabricated on a flat flexible substrate such as the flexible substrate 108 shown in FIG. 4, and ultimately reshaped to an arc-shaped with the orientation shown in FIGS. 33-34. Depending on the shaft and target diameters, the length of the arc-shaped flexible substrate can be from tens to hundreds of millimeters. Like other examples contained herein, a simplified version of an ESPU (e.g., the one or more processors 920) can be integrated on a small area (e.g., 15 mm×15 mm) of a flexible or a rigid substrate (e.g., PCB) connected to the flexible substrate 908 of which the inductive sensing coil 910 is disposed on. In some implementations, the inductive positioning sensor 900 can be designed for an angular measurement range of 0 to 72° degrees (+/−36° degrees) for an iAPS application. One degree of mechanical angle change of the shaft (i.e., target 902) generates one degree of electrical angle change at output.

Figure 35:
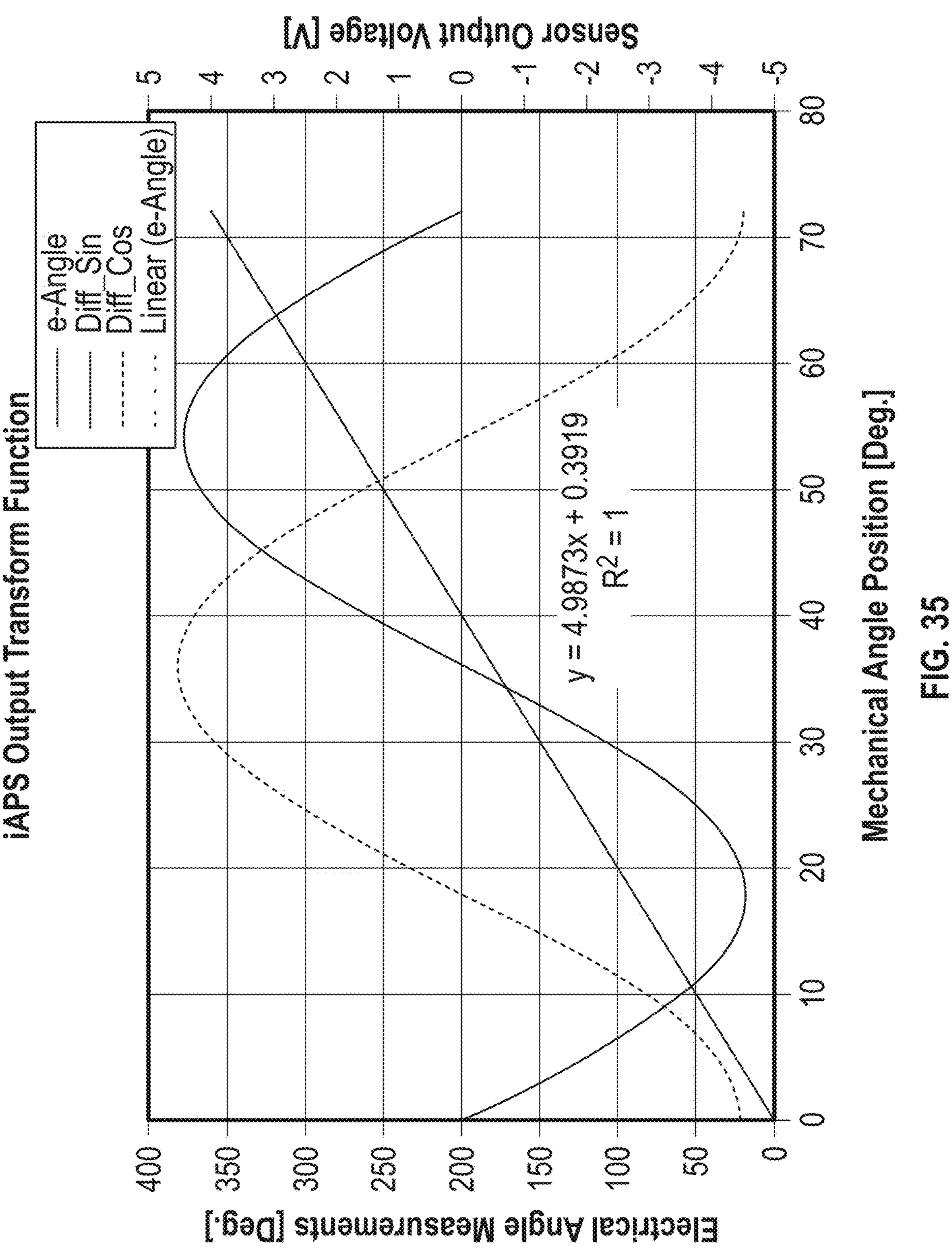
FIG. 35 is a graph demonstrating the output signals and the transfer function of the one-paired pole inductive positioning sensor shown in FIGS. 33 and 34.

FIG. 35 display a transfer function of the one-paired pole (1pp) inductive positioning sensor 900 for the iAPS application having inductive sensing coils 910 on a flexible substrate 908 measuring the angular position of the target 902 (i.e., metallic shaft) between 0 to 72° degrees. The input is mechanical angle position change of the target 902 in degrees [deg.], and the output is an analog signal in voltage [V]. The calculated accuracy of the inductive positioning sensor 900 for an iAPS application with +/−36° degrees operating range can be high.

Inductive Motor/Rotary Position Sensors With and Without Directional Speed Sensor An inductive motor position sensor (iMPS) is a non-contact rotary position sensor (RPS) designed for discerning the position of motor/rotor shafts at both low and high speeds. Often referred to as an Electronics Resolver (e-Resolver), the iMPS distinguishes itself by executing all detections, signal processing, and management tasks electrically on circuits. Serving as an electronic solution, the iMPS captures the geometrical position and orientation of an electric motor shaft throughout its entire operational spectrum. In contrast to traditional bulky and cumbersome electromagnetic resolvers commonly employed in motor positioning systems, the iMPS or e-Resolvers offer a more streamlined and efficient alternative.

Figure 36:
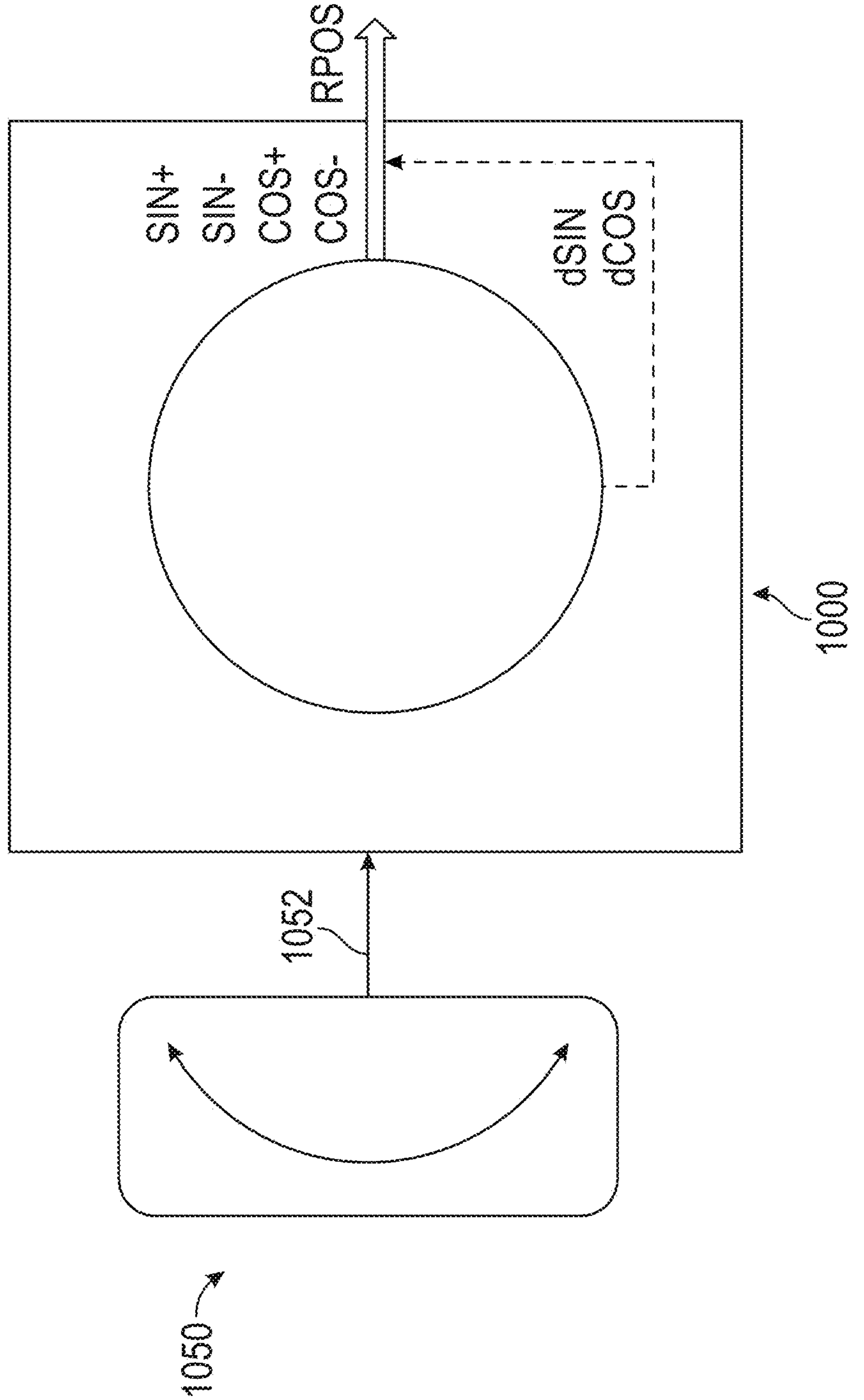
FIG. 36 illustrates a schematic example of an inductive position sensor, according to various implementations.

FIG. 36 illustrates a block diagram of an inductive positioning sensor 1000 (i.e., iRPS/iMPS/e-Resolver) connecting to a mechanical shaft 1052 of a motor/rotary system 1050. This configuration can detect the mechanical angle of a rotary shaft ranging between 0 to 360°. The inductive positioning sensor 1000 can convert the mechanical angle into sinusoidal output electrical signals RPOS. These signals can be delivered in either a single-ended format (SIN+, SIN−, COS+, COS−) or in a differential format (dSIN and dCOS). The electrical frequency of the signals are N times of the mechanical rotation frequency (rotation per minute (RPM)) of the motor shaft. Here, N can represent the number of paired poles of the inductive positioning sensor 1000. The electrical signals can relay the angular position information of the electric motor shaft relative to the motor stator.

Figure 37:
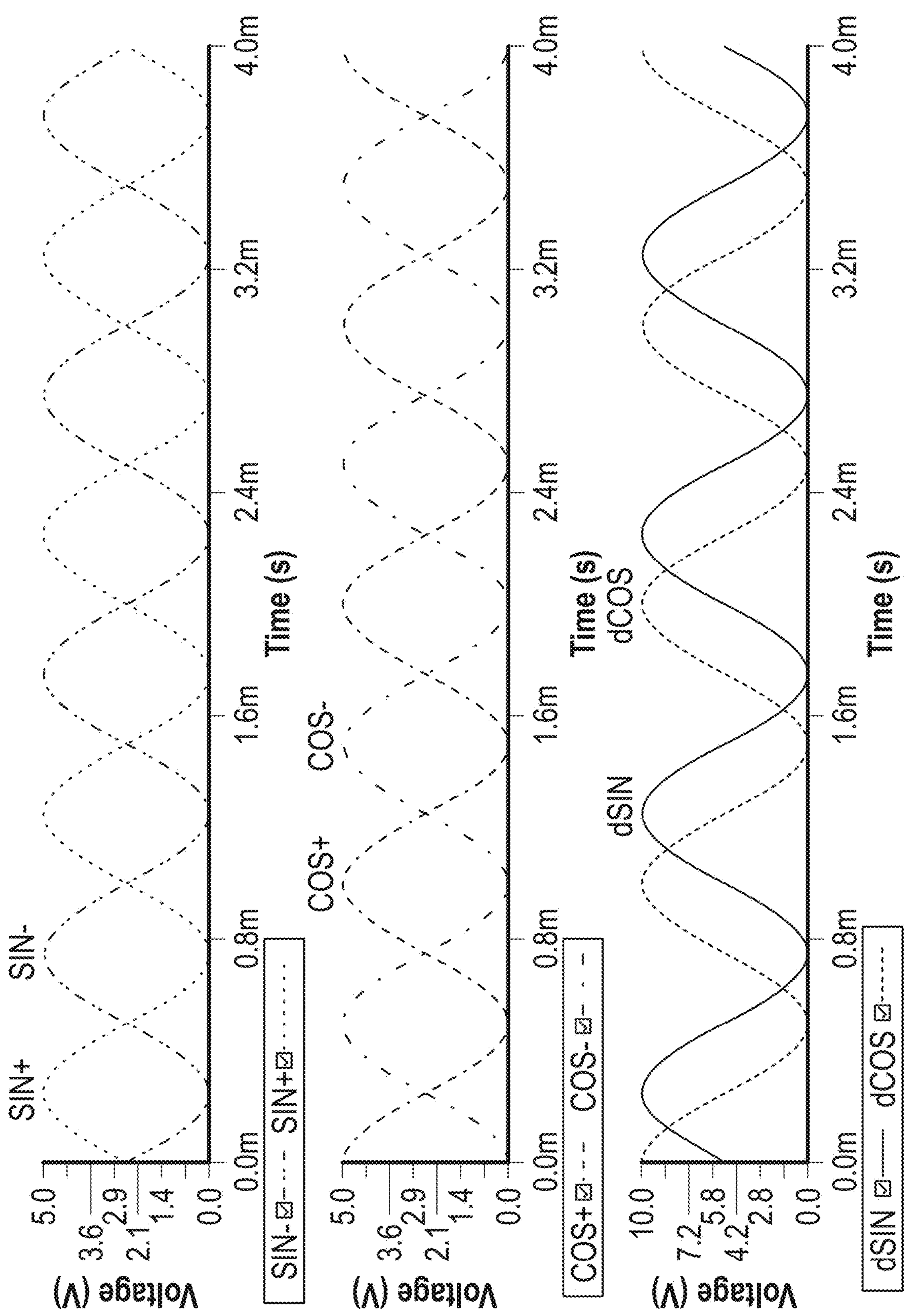
FIG. 37 is a graph demonstrating the sinusoidal output electrical signals of the inductive position sensor shown in FIG. 36.

Traditional and electronic inductive resolvers only provide the angular position of the shaft in the form of sine and cosine formats as shown in FIG. 37. Although the directional speed of the rotary shaft can be extracted from its angular position signals by a processing unit, a noticeable delay emerges at higher speeds. This delay results in desynchronization of the calculated information. For faster processing, the motor system can require an additional separate sensor to measure the shaft angular speed.

Figure 38:
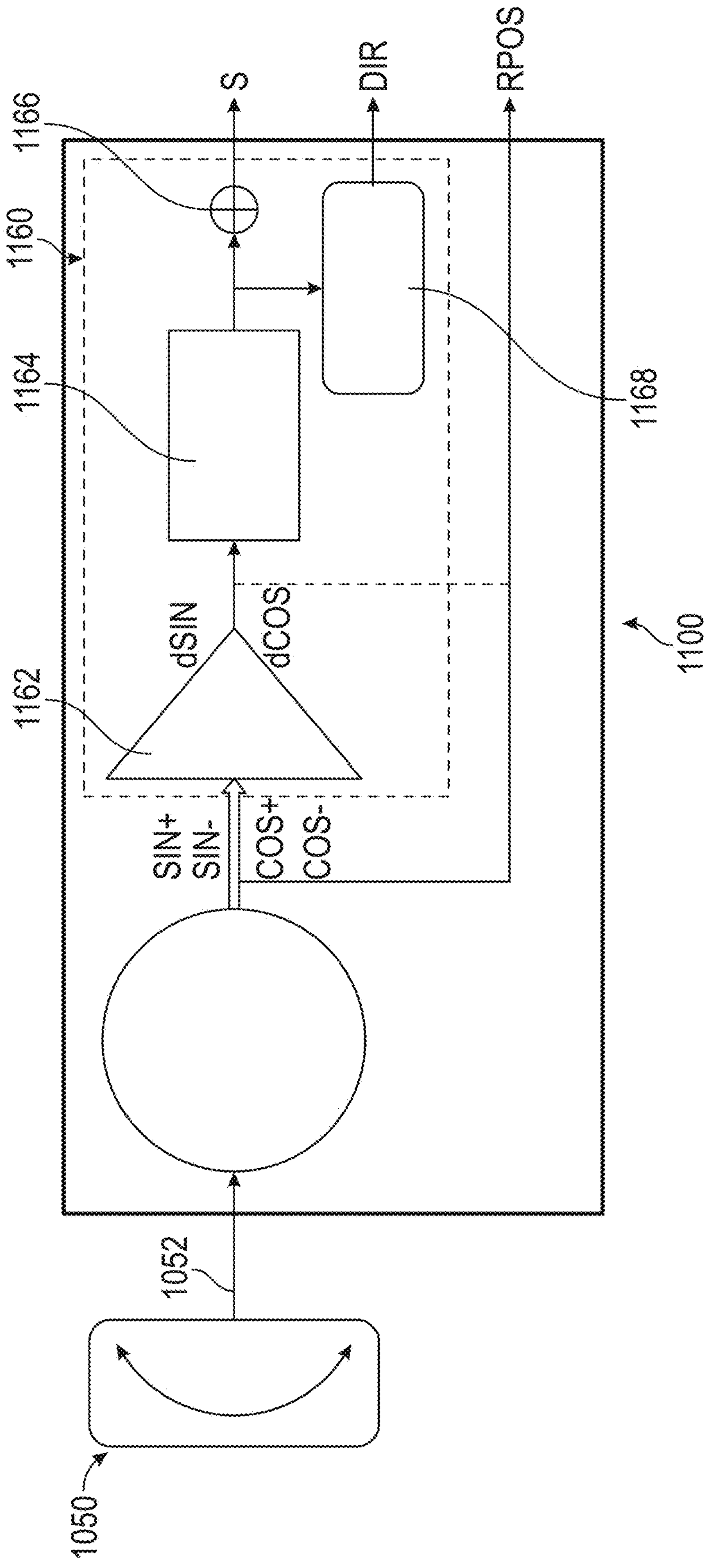
FIG. 38 illustrates a schematic example of an inductive position sensor having an integrated directional speed sensing unit, according to various implementations.
Figure 39:
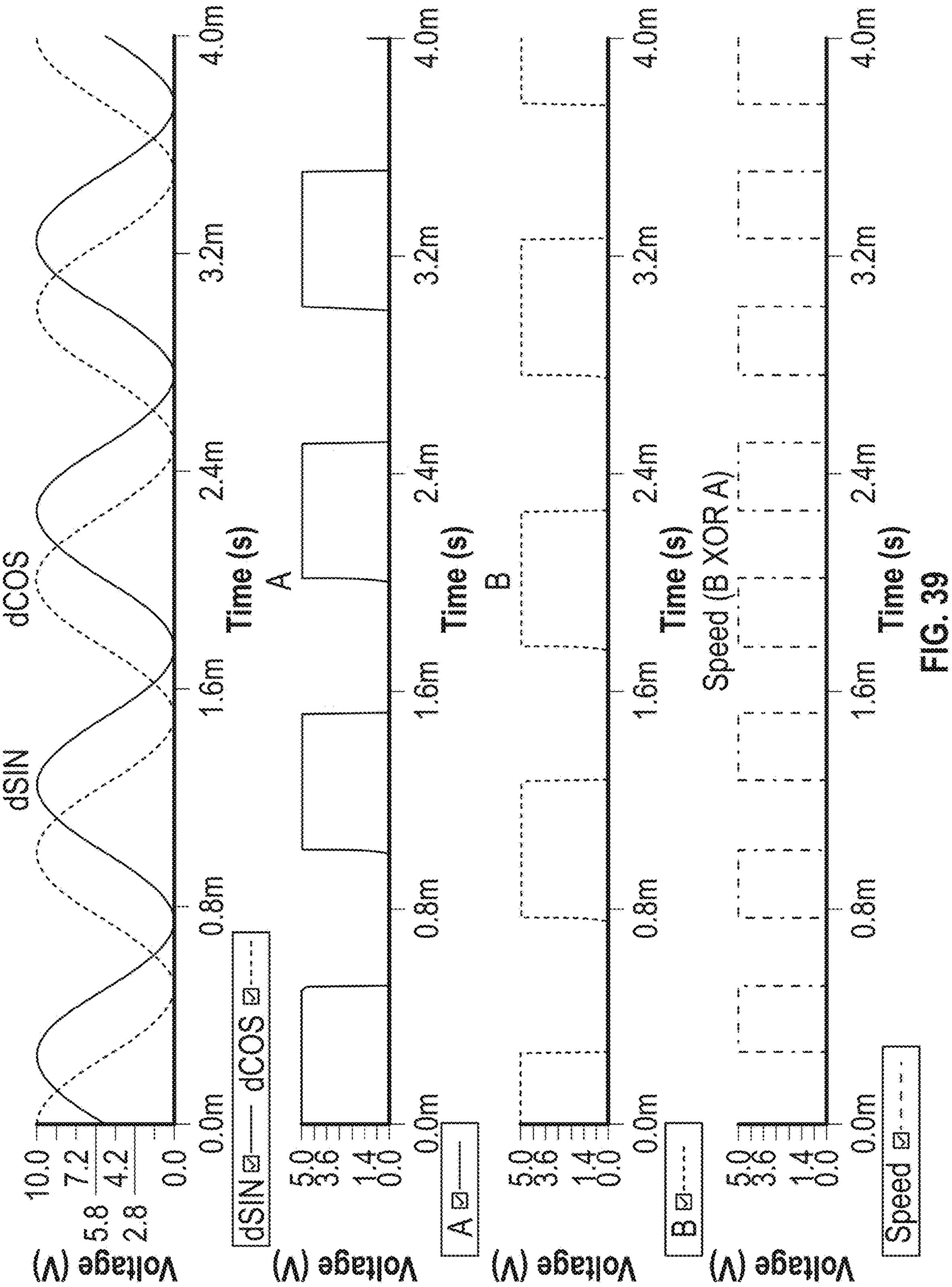
FIG. 39 is a graph demonstrating the sinusoidal output electrical signals and speed pulse signals of the inductive position sensor shown in FIG. 38

FIG. 38 demonstrates a block diagram of an inductive positioning sensor 1100 (e.g., iRPS/iMPS/e-Resolver) with integrated directional speed sensing unit 1160. The inductive positioning sensor 1100 of FIG. 38, unless otherwise noted, may be the same as or generally similar to like-numbered components of FIG. 36. The integrated directional speed sensing unit 1160 can be located locally on-board and includes additional speed and direction detector modules for comparing the base inductive positioning sensor 1000 shown in FIG. 36. The inductive positioning sensor 1100 can detect and measure the mechanical angle position (RPOS), speed, and/or direction of the rotary shaft 1052 as shown in FIG. 39. The integrated directional speed sensing unit 1160 converts the single-ended (SIN+, SIN−, COS+, COS−) RPOS signals of the inductive positioning sensor 1100 (e.g., iMPS/iRPS) to differential signal formats (e.g., dSIN and dCOS) using a differential amplifier stage 1162. An electronic Schmitt-trigger or comparator stage 1164 can convert the dSIN and dCOS signals to pulse A and pulse B signals, respectively. A Schmitt trigger is an electronic circuit used to convert an analog input signal into a digital output signal. The Schmitt trigger can be designed to exhibit hysteresis, meaning that it has two different voltage thresholds for input signals: one for rising voltage and another for falling voltage. The hysteresis in the Schmitt trigger can help to eliminate noise or signal fluctuations near the threshold, making it less susceptible to false triggering. The Schmitt trigger can thus provide a clean and well-defined transition from a low to a high state or vice versa, making it useful in various applications such as signal conditioning, debouncing switches, and square wave signal generation.

In an output stage, as shown in FIG. 39, the integrated directional speed sensing unit 1160 can converts the A and B pulses to a speed pulse signal S using an electronic XOR gate 1166. An XOR gate is a digital logic gate that gives a true output when the number of true inputs is odd. The XOR gate 1166 can implement an exclusive or from mathematical logic; that is, a true output results if one, and only one, of the inputs to the gate is true. If both inputs are false or both are true, a false output results. This speed pulse signal carries the motor shaft rotational speed (RPM) information.

Figure 40:
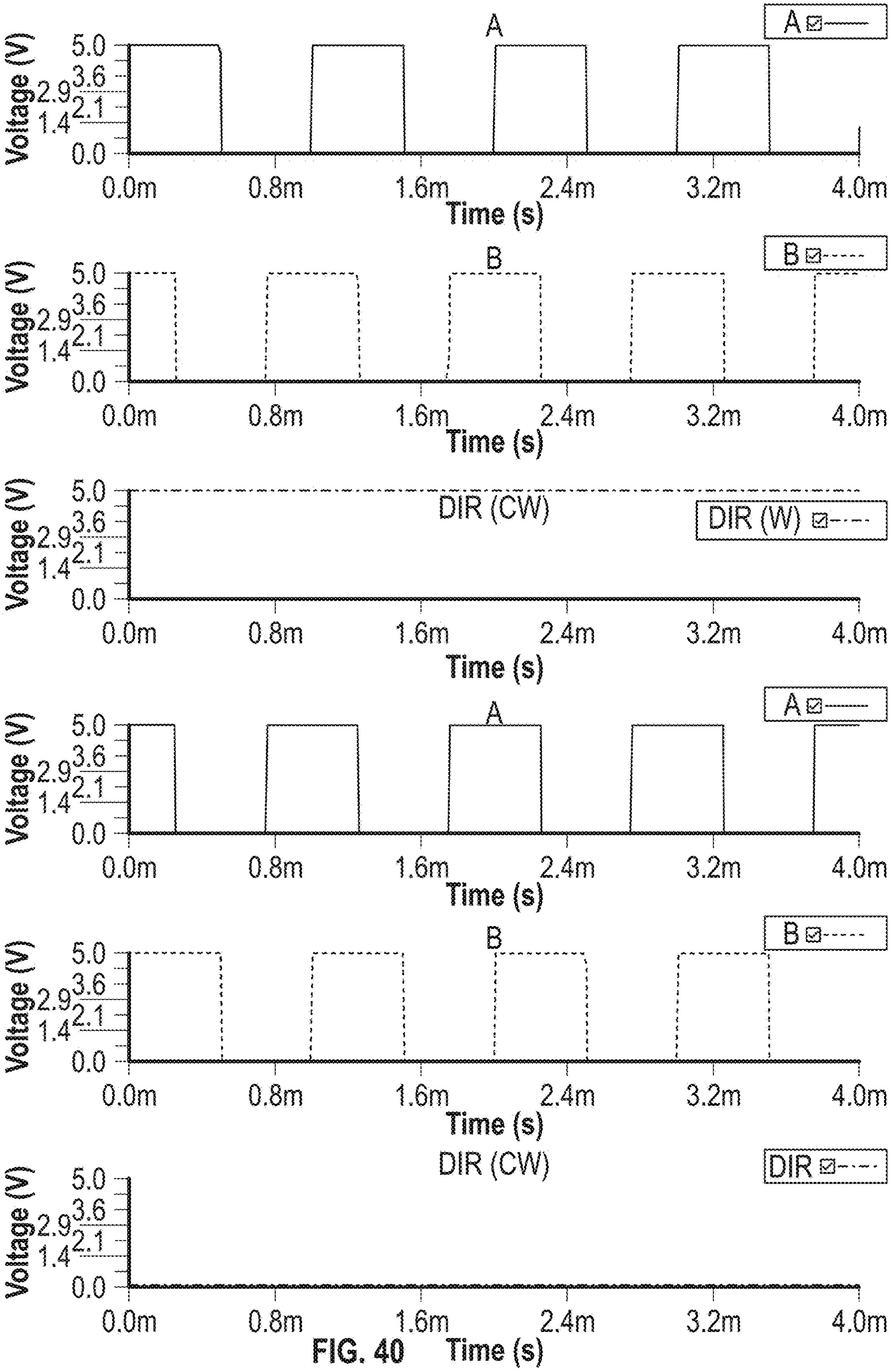
FIG. 40 are graphs demonstrating the determination of the direction of the rotation of the motor shaft.

The inductive positioning sensor 1100, equipped with integrated directional speed sensing unit 1160 can, in a separate output at the final stage, receive the A and B pulses. The integrated directional speed sensing unit 1160 can transform said pulses into another distinct pulse signal that conveys the motor's rotational directions DIR, by employing an electronic quadrature decoder stage 1168. The graphs presented in FIG. 40 illustrate how the inductive positioning sensor 1100 discerns the motor shaft's rotation direction by examining the rising edges of pulses A and B. When determining the motor shaft direction, pulse B precedes pulse A in clockwise (CW) rotation, while pulse A leads pulse B in counterclockwise (CCW) rotation.

Smart Inductive Motor/Rotary Position Sensors

The signals generated by the inductive positioning sensor 1000 and inductive positioning sensor 1100 shown in FIGS. 36 and 38, respectively, can be processed externally by electronic control units (ECU) within the motor/rotary system applications to measure the angular position, speed, and direction of the motor rotor. To overcome potential technical issues when transmitting signals from an e-Resolver sensor to an external ECU (e.g., noise, electromagnetic interferences, long-wiring connections, and cost) as well as additional processing functions at the external ECU, it is beneficial for specific applications of these signals to be processed on-board locally at the e-Resolver device.

Figure 41:
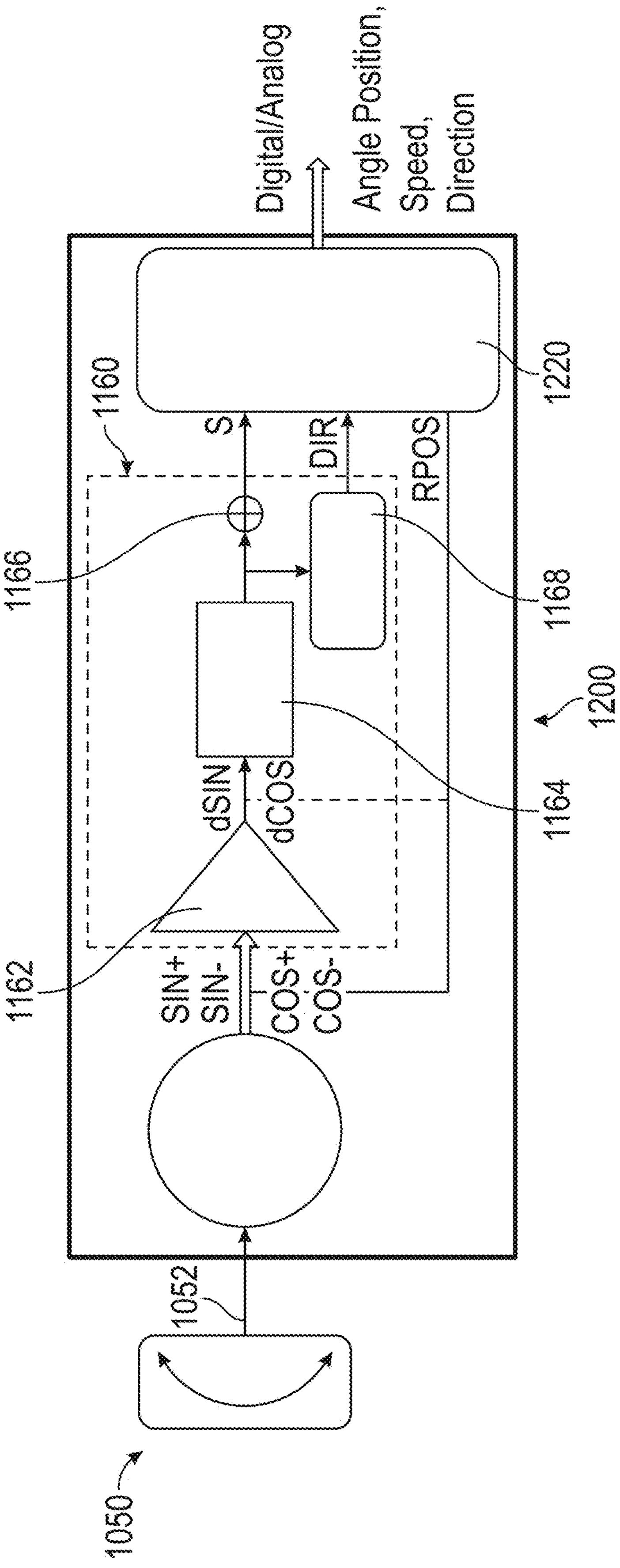
FIG. 41 illustrates a schematic example of an inductive position sensor having an integrated directional speed sensing unit and on-board electronic signal processing unit (ESPU), according to various implementations.

FIG. 41 illustrates a block diagram of a smart inductive positioning sensor 1200 (e.g., e-Resolver/iMPS/iRPS) in which a programable electronics signal processing unit (ESPU) 1220 is added to the final stages of the e-Resolvers of FIGS. 36 and 38. The inductive positioning sensor 1200 of FIG. 41, unless otherwise noted, may be the same as or generally similar to like-numbered components of FIGS. 36 and 38. By adding the ESPU 1220 (e.g., one or more processors) for final signal conditioning, processing, analysis, calibration, and/or configuration, there is an improvement demonstrating high-performance and high-accuracy. Depending on the motor application and its system requirements, the ESPU 1220 of the smart inductive positioning sensor 1200 can include a simple or a high performance microcontroller/microprocessor unit for running several functional algorithms and calibrations for one or more different applications. The programmability of the ESPU 1220 can also allow for the outputs of the smart inductive positioning sensor 1200 to be configurable in different digital and/or analog formats. The output signals can carry the angular position, speed, and/or direction information of the electric motor shaft relative to the motor stator as well as the internal electronic circuit temperature of the smart inductive positioning sensor 1200 which may need in some motor applications.

Terminology

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and embodiments of the embodiments may be made and still fall within the scope of the disclosure. It should be understood that various features and embodiments of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative embodiments, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Moreover, as used herein, when a first element is described as being "on" or "over" a second element, the first element may be directly on or over the second element, such that the first and second elements directly contact, or the first element may be indirectly on or over the second element such that one or more elements intervene between the first and second elements. Where the context permits, words in the above Detailed Description using the singular or plural number may also include the plural or singular number, respectively.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. Additionally, other embodiments are within the scope of the following claims. In some cases, the actions recited in the claims may be performed in a different order and still achieve desirable results.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

Several illustrative examples of long-range position sensors and related systems and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations may also be implemented in combination in a single implementation. Conversely, various features that are described in the context of a single implementation also may be implemented in multiple implementations separately or in any suitable subcombination. Moreover, although features may be described above as acting in certain combinations, one or more features from a claimed combination may in some cases be excised from the combination, and the combination may be claimed as a subcombination or variation of a subcombination.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures may or may not be drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures. or description herein. For example, various functionalities provided by the illustrated modules may be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification may be included in any example.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

What is claimed is:

1. A linear inductive position sensor configured to measure a linear position of an object, the linear inductive position sensor comprising:

a flexible substrate having one or more inductive sensing coils, the one or more inductive sensing coils disposed on or at least partially embedded in the flexible substrate;

a target configured for tracking a position of the object, wherein the one or more inductive sensing coils are configured to be shaped to a surface of the target to maintain an approximately uniform gap between the flexible substrate and the target;

a non-conductive carrier configured to be shaped to be disposed over or around the target, the flexible substrate disposed on a surface of the non-conductive carrier, wherein the flexible substrate is non-planar and conforms to the shape of the non-conductive carrier, and wherein the flexible substrate is fixed to the non-conductive carrier and remains stationary during operation of the linear inductive position sensor, and wherein the target is configured to slide or translate along a track during operation of the linear inductive position sensor; and one or more processors configured to process an output signal and determine a distance based at least in part on the processed output signal, the one or more processors electrically connected to the one or more inductive sensing coils, the one or more processors managing an input signal and the output signal, wherein the one or more processors are configured to determine a position of the target.

2. The linear inductive position sensor of claim 1, wherein the target comprises an electrically conductive moving target.

3. The linear inductive position sensor of claim 1, wherein the flexible substrate is elongated such that a length of the flexible substrate is larger than its width, the inductive position sensor configured to measure linear motion.

4. The linear inductive position sensor of claim 1, wherein a cover surrounds the non-conductive carrier.

5. The linear inductive position sensor of claim 1, wherein the one or more inductive sensing coils and the one or more processors are positioned on the flexible substrate.

6. The linear inductive position sensor of claim 1, wherein the inductive sensing coils comprise primary coils and secondary coils.

7. The linear inductive position sensor of claim 6, wherein the primary coils are transmitting coils and the secondary coils are receiving coils.

8. The linear inductive position sensor of claim 6, wherein the primary coils generate an alternating electromagnetic field that couples to the secondary coils, and wherein the target interrupts the alternating electromagnetic field coupled between the primary coils and the secondary coils.

9. The linear inductive position sensor of claim 1, further comprising an integrated directional speed sensing unit configured to detect and measure a motion, speed, or direction of the target.

10. The linear inductive position sensor of claim 1, wherein the flexible substrate is planar and tangent to a surface of the target.

11. An angular inductive position sensor configured to measure a low-speed and high-speed angle measurement of an object, the angular inductive position sensor comprising:

a substrate having one or more inductive sensing coils, the inductive sensing coils disposed on or at least partially embedded in the substrate, wherein the one or more inductive sensing coils are positioned on a circular-shaped portion on a first end of the substrate;

a target configured for tracking a position of the object, wherein the substrate is stationary during operation of the angular inductive position sensor, and the target is configured to rotate relative to the substrate during operation of the angular inductive position sensor; and one or more processors positioned on a second end of the substrate and configured to process an output signal and determine a distance based at least in part on the processed output signal, the one or more processors electrically connected to the one or more inductive sensing coils, the one or more processors managing an input signal and the output signal, wherein the one or more processors are configured to determine a position of the target.

12. The angular inductive position sensor of claim 11, wherein the target comprises an electrically conductive moving target.

13. The angular inductive position sensor of claim 11, wherein the substrate comprises a flexible substrate and a rigid substrate, wherein the flexible substrate is non-planar and the one or more inductive sensing coils are configured to be shaped to a surface of the target to maintain an approximately uniform gap between the flexible substrate and the target.

14. The angular inductive position sensor of claim 13, wherein the flexible substrate at least partially encircles the target.

15. The angular inductive position sensor of claim 11, wherein the substrate is curved or arched, the inductive position sensor configured to measure angular rotation.

16. The angular inductive position sensor of claim 11, wherein the one or more inductive sensing coils and the one or more processors provide an output transfer function that one degree of mechanical angular rotation change of the target position generates one degree of electrical angle change at output.

17. The angular inductive position sensor of claim 11, wherein the one or more inductive sensing coils comprise primary coils and secondary coils, wherein the primary coils generate an alternating electromagnetic field that couples to the secondary coils, and wherein the target interrupts the alternating electromagnetic field coupled between the primary coils and the secondary coils.

18. The angular inductive position sensor of claim 11, wherein the target comprises an electrically conductive moving target configured for tracking an object for measuring a position of the target.

19. The angular inductive position sensor of claim 11, wherein the one or more processors measure at least one of proximity, angular, and rotary motional positions of the target.

20. The angular inductive position sensor of claim 11, further comprising an integrated directional speed sensing unit configured to detect and measure a mechanical angular position, speed, or direction of the target.

* * * * *